United States Patent
Takahashi et al.

(10) Patent No.: US 9,487,880 B2
(45) Date of Patent: *Nov. 8, 2016

(54) FLEXIBLE SUBSTRATE PROCESSING APPARATUS

(71) Applicant: SEMICONDUCTOR ENERGY LABORATORY CO., LTD., Atsugi-shi, Kanagawa-ken (JP)

(72) Inventors: Minoru Takahashi, Nagano (JP); Yumiko Saito, Kanagawa (JP); Junpei Momo, Kanagawa (JP); Tamae Moriwaka, Kanagawa (JP); Naoto Kusumoto, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 443 days.

This patent is subject to a terminal disclaimer.

(21) Appl. No.: 13/680,269

(22) Filed: Nov. 19, 2012

(65) Prior Publication Data

US 2013/0134051 A1  May 30, 2013

(30) Foreign Application Priority Data

Nov. 25, 2011  (JP) .................................. 2011-257745

(51) Int. Cl.
*C25D 11/00* (2006.01)
*C25D 9/02* (2006.01)
(Continued)

(52) U.S. Cl.
CPC ................. *C25D 11/00* (2013.01); *C25B 3/04* (2013.01); *C25D 1/18* (2013.01); *C25D 5/48* (2013.01);
(Continued)

(58) Field of Classification Search
CPC ..... B82Y 40/00; Y02E 60/13; Y02E 60/122; H01M 4/38; C25D 11/00; C25D 11/005

USPC ................................... 205/137, 615; 204/212
See application file for complete search history.

(56) References Cited

U.S. PATENT DOCUMENTS 2,853,442 A * 9/1958 Swanton .......................... 205/82
4,302,518 A   11/1981 Goodenough et al.
(Continued)

FOREIGN PATENT DOCUMENTS

CN       001127309 A       7/1996
CN       001189544 A       8/1998
(Continued)

OTHER PUBLICATIONS

Paredes et al. "Graphene Oxide Dispersions in Organic Solvents" Langmuir 2008, 24, 10560-10564.*

(Continued)

*Primary Examiner* — Nicholas A Smith
*Assistant Examiner* — Brian W Cohen
(74) *Attorney, Agent, or Firm* — Nixon Peabody LLP; Jeffrey L. Costellia

(57) ABSTRACT

To provide a flexible substrate processing apparatus which allows the stable reduction of an oxide contained in a film-like structure body formed on a flexible substrate. The apparatus has a substrate carrying-out portion where a flexible substrate on which a film-like structure body is formed is unwound; a reduction treatment portion where an oxide contained in the film-like structure body formed on the flexible substrate is electrochemically reduced; a washing portion where the flexible substrate and the film-like structure body are washed; a drying portion where the flexible substrate and the film-like structure body are dried; and a substrate carrying-in portion where the flexible substrate on which the film-like structure body is formed is taken up.

8 Claims, 13 Drawing Sheets

(51) Int. Cl.
| | |
|---|---|
| *C25D 5/54* | (2006.01) |
| *C25D 13/16* | (2006.01) |
| *C25D 1/18* | (2006.01) |
| *C25D 7/06* | (2006.01) |
| *C25D 13/04* | (2006.01) |
| *C25D 5/48* | (2006.01) |
| *C25B 3/04* | (2006.01) |

(52) U.S. Cl.
CPC .............. *C25D 7/0614* (2013.01); *C25D 9/02* (2013.01); *C25D 11/005* (2013.01); *C25D 13/04* (2013.01); *C25D 13/16* (2013.01); *Y02E 60/122* (2013.01); *Y02P 70/54* (2015.11)

(56) References Cited

U.S. PATENT DOCUMENTS

| | | | |
|---|---|---|---|
| 4,668,595 A | 5/1987 | Yoshino et al. | |
| 5,761,801 A * | 6/1998 | Gebhardt et al. | 29/846 |
| 5,783,333 A | 7/1998 | Mayer | |
| 5,871,866 A | 2/1999 | Barker et al. | |
| 5,910,382 A | 6/1999 | Goodenough et al. | |
| 6,085,015 A | 7/2000 | Armand et al. | |
| 6,193,814 B1 * | 2/2001 | Baldi | 148/240 |
| 6,514,640 B1 | 2/2003 | Armand et al. | |
| 7,179,561 B2 | 2/2007 | Niu et al. | |
| 7,572,542 B2 | 8/2009 | Naoi | |
| 7,658,901 B2 | 2/2010 | Prud'homme et al. | |
| 7,736,913 B2 | 6/2010 | Basol | |
| 7,745,047 B2 | 6/2010 | Zhamu et al. | |
| 7,842,432 B2 | 11/2010 | Niu et al. | |
| 7,897,416 B2 | 3/2011 | Basol | |
| 7,939,218 B2 | 5/2011 | Niu | |
| 7,977,007 B2 | 7/2011 | Niu et al. | |
| 7,977,013 B2 | 7/2011 | Niu et al. | |
| 8,278,011 B2 | 10/2012 | Zhu et al. | |
| 8,317,984 B2 | 11/2012 | Gilje | |
| 2001/0010807 A1 | 8/2001 | Matsubara | |
| 2002/0195591 A1 | 12/2002 | Ravet et al. | |
| 2004/0043294 A1 | 3/2004 | Fukui et al. | |
| 2006/0051671 A1 | 3/2006 | Thackeray et al. | |
| 2007/0131915 A1 | 6/2007 | Stankovich et al. | |
| 2007/0227633 A1 * | 10/2007 | Basol | 148/518 |
| 2008/0048153 A1 | 2/2008 | Naoi | |
| 2008/0254296 A1 | 10/2008 | Honda et al. | |
| 2009/0110627 A1 | 4/2009 | Choi et al. | |
| 2009/0117467 A1 | 5/2009 | Zhamu et al. | |
| 2009/0166189 A1 | 7/2009 | Saitou | |
| 2010/0035093 A1 | 2/2010 | Ruoff et al. | |
| 2010/0055025 A1 | 3/2010 | Jang et al. | |
| 2010/0081057 A1 | 4/2010 | Liu et al. | |
| 2010/0105834 A1 | 4/2010 | Tour et al. | |
| 2010/0143798 A1 | 6/2010 | Zhamu et al. | |
| 2010/0176337 A1 | 7/2010 | Zhamu et al. | |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0301279 A1 | 12/2010 | Nesper et al. | |
| 2010/0303706 A1 | 12/2010 | Wallace et al. | |
| 2010/0308277 A1 | 12/2010 | Grupp | |
| 2010/0330421 A1 | 12/2010 | Cui et al. | |
| 2011/0012067 A1 | 1/2011 | Kay | |
| 2011/0111294 A1 | 5/2011 | Lopez et al. | |
| 2011/0111303 A1 | 5/2011 | Kung et al. | |
| 2011/0121240 A1 | 5/2011 | Amine et al. | |
| 2011/0136019 A1 | 6/2011 | Amiruddin et al. | |
| 2011/0159372 A1 | 6/2011 | Zhamu et al. | |
| 2011/0203831 A1 | 8/2011 | Schmidt | |
| 2011/0227000 A1 | 9/2011 | Ruoff et al. | |
| 2011/0229795 A1 | 9/2011 | Niu et al. | |
| 2012/0021273 A1 | 1/2012 | Ohmori et al. | |
| 2012/0045692 A1 | 2/2012 | Takemura et al. | |
| 2012/0058397 A1 | 3/2012 | Zhamu et al. | |
| 2012/0064409 A1 | 3/2012 | Zhamu et al. | |
| 2012/0088151 A1 | 4/2012 | Yamazaki et al. | |
| 2012/0088156 A1 | 4/2012 | Nomoto et al. | |
| 2012/0100402 A1 | 4/2012 | Nesper et al. | |
| 2012/0308884 A1 | 12/2012 | Oguni et al. | |
| 2012/0308891 A1 | 12/2012 | Todoriki et al. | |
| 2012/0315550 A1 | 12/2012 | Liu et al. | |
| 2013/0045156 A1 | 2/2013 | Nomoto et al. | |
| 2013/0084384 A1 | 4/2013 | Yamakaji | |
| 2013/0266859 A1 | 10/2013 | Todoriki et al. | |
| 2013/0266869 A1 * | 10/2013 | Todoriki et al. | 429/231.8 |

FOREIGN PATENT DOCUMENTS

| | | |
|---|---|---|
| CN | 101260554 A | 9/2008 |
| CN | 101331248 A | 12/2008 |
| CN | 101454486 A | 6/2009 |
| CN | 101562248 A | 10/2009 |
| CN | 101871109 A | 10/2010 |
| CN | 101956221 A | 1/2011 |
| CN | 102099506 A | 6/2011 |
| CN | WO2011069348 A1 * | 6/2011 |
| CN | 102168293 A | 8/2011 |
| JP | 08-037007 A | 2/1996 |
| JP | 2002-033572 A | 1/2002 |
| JP | 2003-193293 A | 7/2003 |
| JP | 2003-238131 A | 8/2003 |
| JP | 2003-328186 A | 11/2003 |
| JP | 2004-263215 A | 9/2004 |
| JP | 2006-265751 | 10/2006 |
| JP | 2009-524567 | 7/2009 |
| JP | 2009-176721 | 8/2009 |
| JP | 2009-532588 | 9/2009 |
| JP | 2011-500488 | 1/2011 |
| JP | 2011-503804 | 1/2011 |
| JP | 2011-048992 A | 3/2011 |
| JP | 2011-517053 | 5/2011 |
| JP | 2011-105569 A | 6/2011 |
| JP | 2011-168449 A | 9/2011 |
| WO | WO 2006/062947 A2 | 6/2006 |
| WO | WO-2006/071076 | 7/2006 |
| WO | WO 2007/061945 A2 | 5/2007 |
| WO | WO-2007/115318 | 10/2007 |
| WO | WO-2007/116774 | 10/2007 |
| WO | WO-2009/061685 A1 | 5/2009 |
| WO | WO 2009/127901 A1 | 10/2009 |
| WO | WO 2009/144600 A2 | 12/2009 |
| WO | WO-2011/026581 | 3/2011 |
| WO | WO-2011/141486 | 11/2011 |

OTHER PUBLICATIONS

Du et al. "One-step electrochemical deposition of a graphene-ZrO2 nanocomposite" J. Mater. Chem., 2011, 21, 8032.*

Jo et al. "Large-Scale patterned multi-layer graphene films as transparent conducting electrodes for GaN light-emitting diodes" Nanotechnology 21 (2010) 175201 p. 1-6.*

Harima et al. "Electrochemical reduction of graphene oxide in oragnic solvents" Electrochimica Acta 56 (2011) 5363-5368.*

Sundaram et al., "Electrochemical Modification of Graphene", Advanced Materials, Aug. 18, 2008, vol. 20, No. 16, pp. 3050-3053.

Zhou et al., "Controlled Synthesis of Large-Area and Patterned Electrochemically Reduced Graphene Oxide Films", Chemistry a European Journal, Jun. 15, 2009, vol. 15, No. 25, pp. 6116-6120.

Yuyan et al., "Facile and Controllable Electrochemical Reduction of Graphene Oxide and Its Application", Journal of Materials Chemistry, 2010, vol. 20, pp. 743-748.

Zhou.X et al., "Graphene modified LiFePO4 cathode materials for high power lithium ion batteries ,", J. Mater. Chem. (Journal of Materials Chemistry), 2011, vol. 21, pp. 3353-3358.

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors,", Nano Letters, 2011, vol. 11, No. 7, pp. 2905-2911.

(56) References Cited

OTHER PUBLICATIONS

Padhi.A et al., "Phospho-olivines as Positive-Electrode Materials for Rechargeable Lithium Batteries", J. Electrochem. Soc. (Journal of the Electrochemical Society), Apr. 1, 1997, vol. 144, No. 4, pp. 1188-1194.

Paek.S et al., "Enhanced Cyclic Performance and Lithium Storage Capacity of SnO2/Graphene Nanoporous Electrodes with Three-Dimensionally Delaminated Flexible Structure", Nano Letters, 2009, vol. 9, No. 1, pp. 72-75.

Wang.G et al., "Sn/graphene nanocomposite with 3D architecture for enhanced reversible lithium storage in lithium ion batteries", J. Mater. Chem. (Journal of Materials Chemistry), 2009, vol. 19, No. 44, pp. 8376-8384.

Wang.D et al., "Self-Assembled TiO2-Graphene Hybrid Nanostructures for Enhanced Li-Ion insertion", ACS NANO, 2009, vol. 3, No. 4, pp. 907-914.

Todoriki.H et al., "High performance lithium ion battery using Graphene Net electrode", 222nd ECS Meeting Abstract, Oct. 7, 2012, p. 1014, ECS.

Wang.Z et al., "Direct Electrochemical Reduction of Single-Layer Graphene Oxide and Subsequent Functionalization with Glucose Oxidase", J. Phys. Chem. C (Journal of Physical Chemistry C), 2009, vol. 113, No. 32, pp. 14071-14075.

Mattevi.C et al., "Evolution of electrical, chemical, and structural properties of transparent and conducting chemically derived graphene thin films", Adv. Funct. Mater. (Advanced Functional Materials), Jun. 8, 2009, vol. 19, No. 16, pp. 2577-2583.

Zhang.H et al., "Vacuum-assisted synthesis of graphene from thermal exfoliation and reduction of graphite oxide", J. Mater. Chem. (Journal of Materials Chemistry), Apr. 14, 2011, vol. 21, No. 14, pp. 5392-5397.

Park.S et al., "Hydrazine-reduction of graphite-and graphene oxide", Carbon, Mar. 15, 2011, vol. 49, No. 9, pp. 3019-3023, Elsevier.

Dreyer.D et al., "The Chemistry of Graphene Oxide", Chemical Society Reviews, Nov. 3, 2009, vol. 39, No. 1, pp. 228-240.

Wang.L et al., "A facile method of preparing mixed conducting LiFePO4/graphene composites for lithium-ion batteries", Solid State Ionics, Oct. 28, 2010, vol. 181, pp. 1685-1689, Elsevier.

Chinese Office Action (Application No. 201210481473.9) Dated Apr. 8, 2016.

* cited by examiner

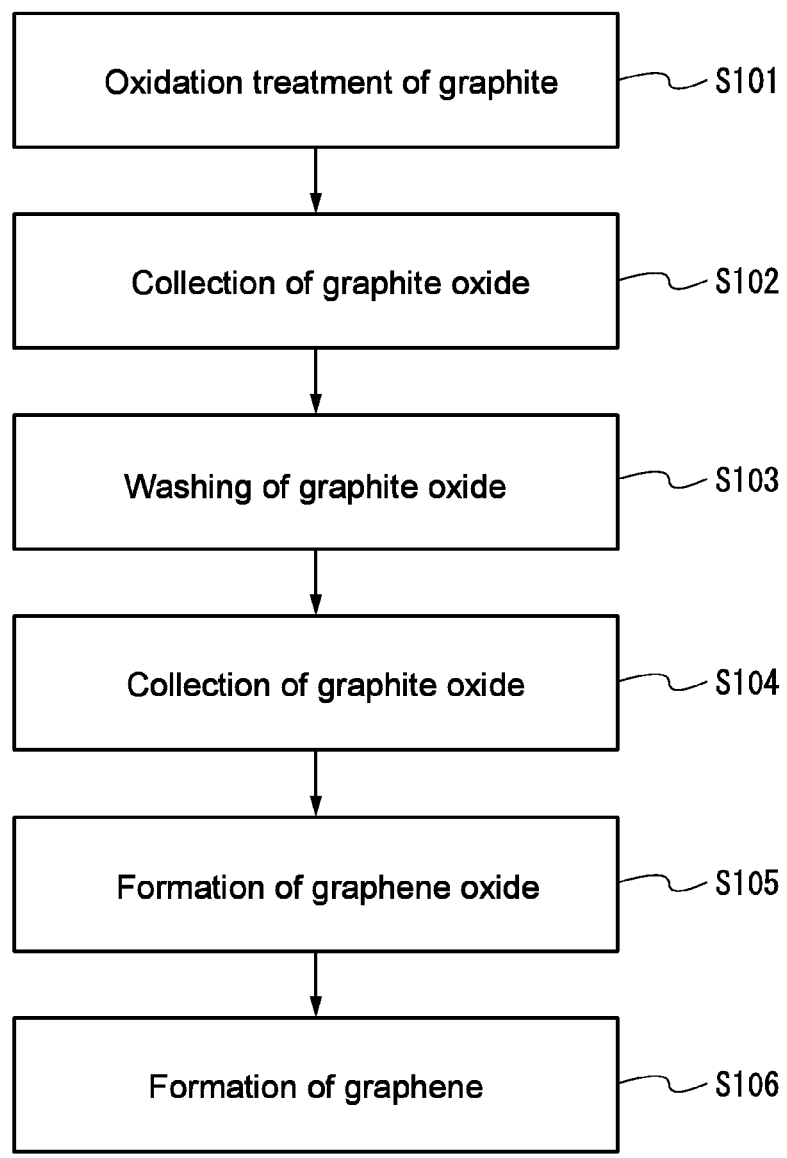

FLEXIBLE SUBSTRATE PROCESSING APPARATUS

BACKGROUND OF THE INVENTION

1. Field of the Invention

The present invention relates to a flexible substrate processing apparatus.

2. Description of the Related Art

In recent years, graphene, which is one of carbon materials, has attracted attention as an electronic material with high conductivity, high flexibility, and high mechanical strength, and attempts have been made to apply graphene to a variety of products.

Application of graphene to power storage devices such as a lithium secondary battery and a lithium-ion capacitor is one of the attempts. Graphene which coats or is mixed into an electrode of the power storage device can increase the conductivity of the electrode.

As an example of a method for forming graphene, the method of reducing graphite oxide in the presence of a base is disclosed in Patent Document 1. In order to form graphite oxide, a method using sulfuric acid, nitric acid, and potassium chlorate as an oxidizer, a method using sulfuric acid and potassium permanganate as an oxidizer, a method using potassium chlorate and fuming nitric acid as an oxidizer, or the like can be employed.

A solution containing graphite oxide which is formed by the above method is subjected to ultrasonic treatment or is stirred, whereby the graphite oxide is separated to form graphene oxide. Then, the graphene oxide is reduced in the presence of a base, so that graphene can be formed.

Alternatively, the graphene oxide can be reduced by heat treatment to form graphene.

REFERENCE

[Patent Document 1] Japanese Published Patent Application No. 2011-500488

SUMMARY OF THE INVENTION

The conductivity of graphene formed by the reduction of graphene oxide depends on the bonding state of carbon atoms in the graphene. Graphene having a higher proportion of $C(sp^2)$-$C(sp^2)$ double bonds has higher conductivity.

In terms of productivity, a substrate on which an oxide such as graphene oxide is formed is preferably a flexible substrate which can be rolled.

In view of the above, an object of one embodiment of the present invention is to provide a flexible substrate processing apparatus with which graphene having high conductivity is formed on a flexible substrate. Another object of one embodiment of the present invention is to provide a flexible substrate processing apparatus with which an oxide formed on a flexible substrate can be reduced.

One embodiment of the present invention disclosed in this specification is a roll-to-roll flexible substrate processing apparatus with which an oxide formed on a long length of flexible substrate is reduced.

In order to increase the proportion of $sp^2$ bonds in graphene for the purpose of increasing the conductivity of the graphene, electrochemical reduction is preferred to heat treatment in reducing graphene oxide.

Note that, to electrochemically reduce an oxide stably, it is necessary to perform treatment in an electrolyte with a distance uniformly kept between a substrate on which an oxide is formed and a counter electrode. Variations in the distance cause variations in quality of a material formed by reduction.

Note that the structure of the oxide is not limited to a structure including only an oxide and includes a structure of a stack or mixture of an oxide and a material which is not an oxide. In this specification, the oxide is referred to as a film-like structure body regardless of the structure.

Thus, to stably perform electrochemical reduction treatment with high productivity, it is preferable to use a roll-to-roll apparatus of one embodiment of the present invention.

One embodiment of the present invention disclosed in this specification is a flexible substrate processing apparatus having a substrate carrying-out portion where a flexible substrate on which a film-like structure body is formed is unwound; a reduction treatment portion where an oxide contained in the film-like structure body is electrochemically reduced; a washing portion where the flexible substrate and the film-like structure body are washed; a drying portion where the flexible substrate and the film-like structure body are dried; and a substrate carrying-in portion where the flexible substrate on which the film-like structure body is formed is taken up.

One embodiment of the present invention disclosed in this specification is a flexible substrate processing apparatus having a substrate carrying-out portion where a flexible substrate wound around a first bobbin is unwound; a reduction treatment portion that has a first bath with an electrolyte, a first electrode that is soaked in the electrolyte and located in parallel with the flexible substrate, and first rollers that support the flexible substrate so that the flexible substrate is soaked in the electrolyte; a washing portion that has a second bath with a washing solution and second rollers that support the flexible substrate so that the flexible substrate is soaked in the washing solution; a drying portion where the flexible substrate is dried; and a substrate carrying-in portion where the flexible substrate is wound to a second bobbin. One or more of the first bobbin, the second bobbin, the first rollers, and the second rollers serve as a second electrode. The substrate carrying-out portion, the reduction treatment portion, the washing portion, the drying portion, and the substrate carrying-in portion are combined in the above order in a path of the flexible substrate.

In the flexible substrate processing apparatus, one of or both the washing portion and the drying portion may be omitted.

The substrate carrying-out portion, the reduction treatment portion, the washing portion, the drying portion, and the substrate carrying-in portion preferably have respective chambers.

At least the reduction treatment portion, the washing portion, and the drying portion are each preferably provided with an atmosphere controlling portion.

Nip rollers or slits are provided between the substrate carrying-out portion and the reduction treatment portion, between the reduction treatment portion and the washing portion, between the washing portion and the drying portion, and between the drying portion and the substrate carrying-in portion. The flexible substrate can be carried through the nip rollers or the slits.

Blowing treatment portions are preferably provided in the reduction treatment portion and the washing portion in the flexible substrate carrying path. The blowing treatment portions can remove most of the electrolyte or the washing solution which is attached to the flexible substrate.

The first electrode and the second electrode are made to serve as a cathode and an anode, respectively, and a reduction potential is supplied between the first and second electrodes, whereby an oxide contained in the film-like structure body can be electrochemically reduced.

It is preferable that the first electrodes be provided on both the top surface side and the bottom surface side of the flexible substrate so that the first electrodes are uniformly apart from the flexible substrate. In the case where the film-like structure body is formed on only one of the surfaces of the flexible substrate, however, the first electrode may be provided only on the side of the surface where the film-like structure body is formed.

The second electrode is preferably provided with a contact portion where the second electrode is in contact with the flexible substrate, so as to be at the same potential as the flexible substrate.

A film-like structure body forming portion where the film-like structure body is formed on the flexible substrate and a film-like structure body drying portion where the film-like structure body is dried may be provided in this order in the flexible substrate carrying path which precedes the reduction treatment portion.

A stacking portion where a stack of the flexible substrate and plural flexible substrates other than the flexible substrate are formed may be provided in the flexible substrate carrying path which directly precedes the substrate carrying-in portion.

The substrate carrying-in portion may be provided with a plurality of carrying paths through which the plurality of flexible substrates are brought in.

According to one embodiment of the present invention, it is possible to provide a flexible substrate processing apparatus which allows the formation of graphene having high conductivity on a flexible substrate. Further, it is possible to provide a flexible substrate processing apparatus which permits the stable reduction of an oxide formed on a flexible substrate. Furthermore, it is possible to improve the quality and productivity of a product including a film-like structure body formed on a flexible substrate.

BRIEF DESCRIPTION OF THE DRAWINGS

In the accompanying drawings:

FIG. 8 shows a conventional formation method of graphene;

DETAILED DESCRIPTION OF THE INVENTION

Figure 1:
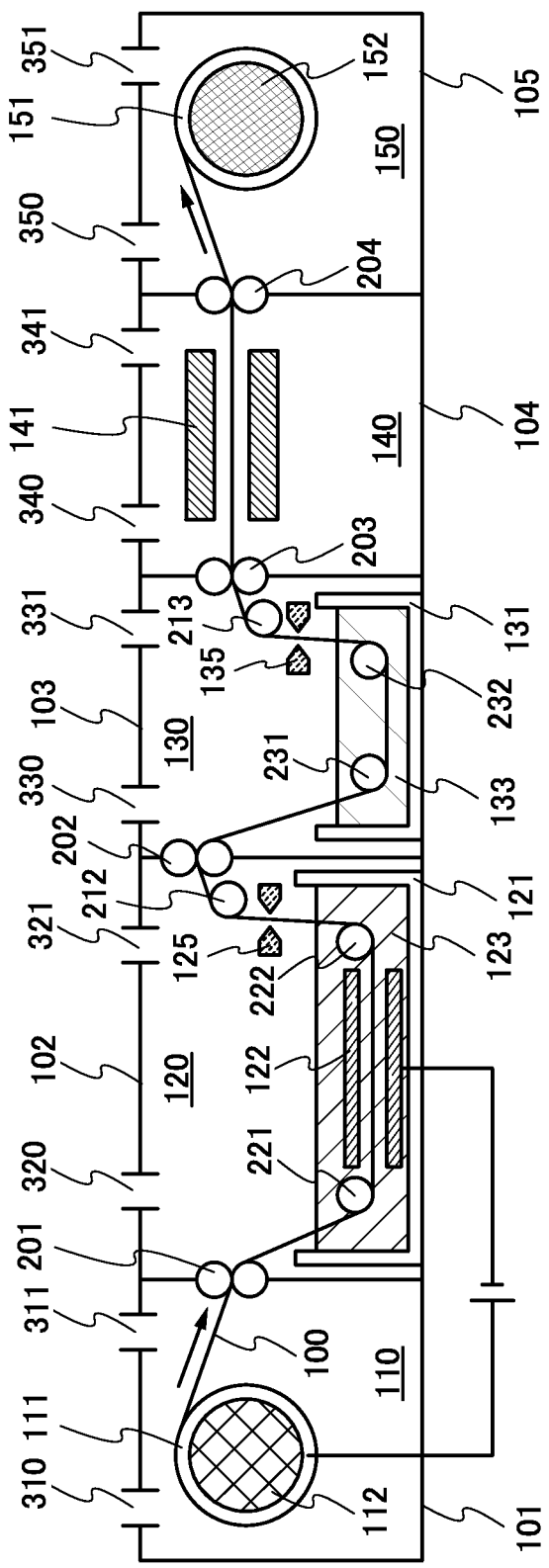
FIG. 1 illustrates a flexible substrate processing apparatus of one embodiment of the present invention.

Embodiments of the present invention will be described with reference to the drawings. Note that the present invention is not limited to the following description and it will be readily appreciated by those skilled in the art that modes and details can be modified in various ways without departing from the spirit and scope of the present invention. Therefore, the present invention should not be construed as being limited to the description in the embodiments. In description using the drawings for reference, in some cases, common reference numerals are used for the same portions in different drawings. Further, in some cases, the same hatching patterns are applied to similar portions, and the similar portions are not necessarily designated by reference numerals.

(Embodiment 1)

In this embodiment, descriptions will be given of a structure of a flexible substrate processing apparatus of one embodiment of the present invention and a process performed in the apparatus.

The flexible substrate processing apparatus of one embodiment of the present invention includes an electrochemical reduction treatment portion where an oxide contained in a film-like structure body formed on a flexible substrate can be stably reduced.

The flexible substrate refers to a substrate that can be easily curved and bent, such as metal foil, a resin film, or an ultrathin glass substrate. A flexible substrate which can be used in this embodiment needs to have conductivity; thus, metal foil or the like is preferably used. Note that even an insulating material can be used as long as it is processed so that its surface has conductivity by being covered with a metal film or the like.

The film-like structure body formed on the flexible substrate is either thin or thick and contains one or more materials selected from metal compounds, organic compounds, semiconductor materials, and the like as well as the oxide. Alternatively, the film-like structure body can be formed of only the oxide. The film-like structure body is not limited to a mixture of any of the above materials and may be a stack of any of the above materials.

The flexible substrate processing apparatus of one embodiment of the present invention can be used for, for example, a process in which graphene oxide is reduced to form graphene. The flexible substrate processing apparatus can also be used for a process for reducing any other oxide that can be electrochemically reduced.

FIG. 1 is a conceptual diagram of the structure of the flexible substrate processing apparatus of one embodiment of the present invention. The flexible substrate processing apparatus has a substrate carrying-out portion 110 where a flexible substrate on which a film-like structure body is formed is unwound; a reduction treatment portion 120 where an oxide contained in the film-like structure body is electrochemically reduced; a washing portion 130 where the flexible substrate and the film-like structure body are washed; a drying portion 140 where the flexible substrate and the film-like structure body are dried; and a substrate carrying-in portion 150 where the flexible substrate on which the film-like structure body is formed is taken up. The flexible substrate processing apparatus is a so-called roll-to-roll system where the flexible substrate is carried sequentially to the above portions.

Figure 2A:
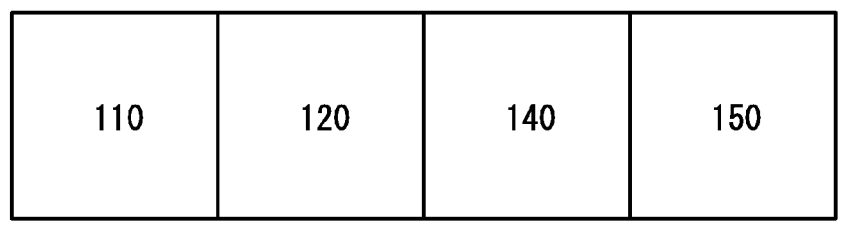
FIGS. 2A to 2C each illustrate a flexible substrate processing apparatus of one embodiment of the present invention.
Figure 2B:
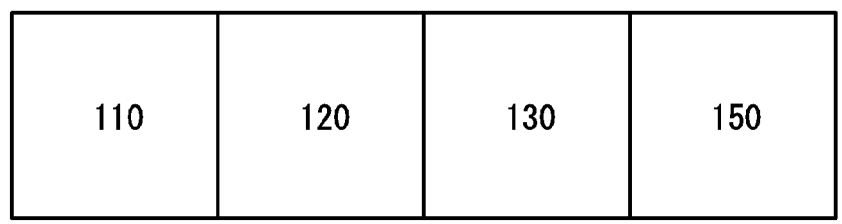
Figure 2C:
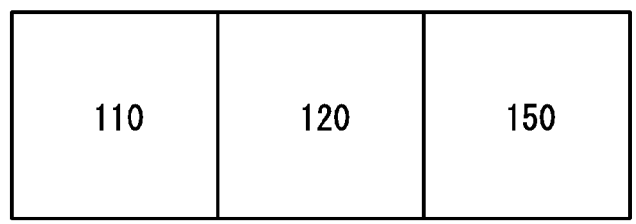

Note that a flexible substrate processing apparatus of one embodiment of the present invention may have the structure illustrated in FIG. 2A, the structure in FIG. 1 from which the washing portion 130 is omitted as illustrated in FIG. 2A. A washing process performed in the washing portion 130 can be skipped unless the quality and yield of a product to be manufactured is adversely affected. FIGS. 2A to 2C each illustrate an apparatus structure using the reference numerals in the structure in FIG. 1 for simplicity.

Alternatively, a flexible substrate processing apparatus of one embodiment of the present invention can have the structure illustrated in FIG. 2B, the structure in FIG. 1 from which the drying portion 140 is omitted as illustrated in FIG. 2B. In the case where an electrolyte used for electrochemical reduction in the reduction treatment portion 120 is highly volatile or in the case where there is no problem if a film-like structure body contains such an electrolyte, the drying portion 140 can be omitted.

Still alternatively, a flexible substrate processing apparatus of one embodiment of the present invention can have the structure in FIG. 1 from which the washing portion 130 and the drying portion 140 are omitted as illustrated in FIG. 2C in the case where both the conditions, which allow the structures in FIGS. 2A and 2B, are met.

It is preferable that the substrate carrying-out portion 110, the reduction treatment portion 120, the washing portion 130, the drying portion 140, and the substrate carrying-in portion 150 have respective chambers (first to fifth chambers 101 to 105) which are individually provided as illustrated in FIG. 1. At the chambers, inlets 310, 320, 330, 340, and 350 and outlets 311, 321, 331, 341, and 351 are provided as atmosphere controlling portions; the introduction of a gas from the inlet enables an atmosphere in the chamber to be replaced. The locations of the inlets and the outlets are not limited to those illustrated, and the inlets and the outlets may be provided anywhere as long as an atmosphere in the chamber can be replaced efficiently. The inlets and the outlets may be provided with mechanisms that promote intake and mechanisms that promote exhaustion, respectively.

For example, when atmospheres in the second chamber 102 and the third chamber 103 are replaced with a rare gas whose dew point is extremely low or the like, the reaction between moisture or the like in the air and an electrolyte in the reduction treatment portion 120, a washing solution in the washing portion 130, or the like can be suppressed. Further, when a fourth chamber 104 is provided, in addition to suppression of the reaction, a reduction in effect of heating any of the other portions by the drying portion 140 is possible, so that processing can be stably performed for a long period.

When the airtightness of the second chamber 102 and the fourth chamber 104 is high, the first chamber 101 and the fifth chamber 105 can be omitted. The omission of the chambers results in an improvement in workability. To increase the airtightness of each chamber, it is preferable to provide nip rollers 201, 202, 203, and 204 between the first chamber 101 and the second chamber 102, between the second chamber 102 and the third chamber 103, between the third chamber 103 and the fourth chamber 104, between the fourth chamber 104 and the fifth chamber 105, respectively, as illustrated in FIG. 1. The nip rollers provided can minimize an opening between the chambers which is needed to carry the flexible substrate. As the nip roller, it is preferable to use the one whose axis formed of metal or the like is partly covered with an elastic body such as silicon rubber.

Note that it is preferable to sequentially introduce gases from the inlets 310, 320, 330, 340, and 350. Mechanisms that remove impurities from the gases exhausted from the outlets 311, 321, 331, 341, and 351 may be provided between the respective outlets and the respective inlets and the gases may be circulated. The circulation of the gases leads to a reduction in running cost.

In the case of locating the flexible substrate processing apparatus in a place where the humidity is controlled to be low, such as a dry room, one embodiment of the present invention is not limited to the above structure; only a chamber (chambers) needs to be provided for a portion judged as being necessary by a practitioner out of the substrate carrying-out portion 110, the reduction treatment portion 120, the washing portion 130, the drying portion 140, and the substrate carrying-in portion 150.

Figure 3:
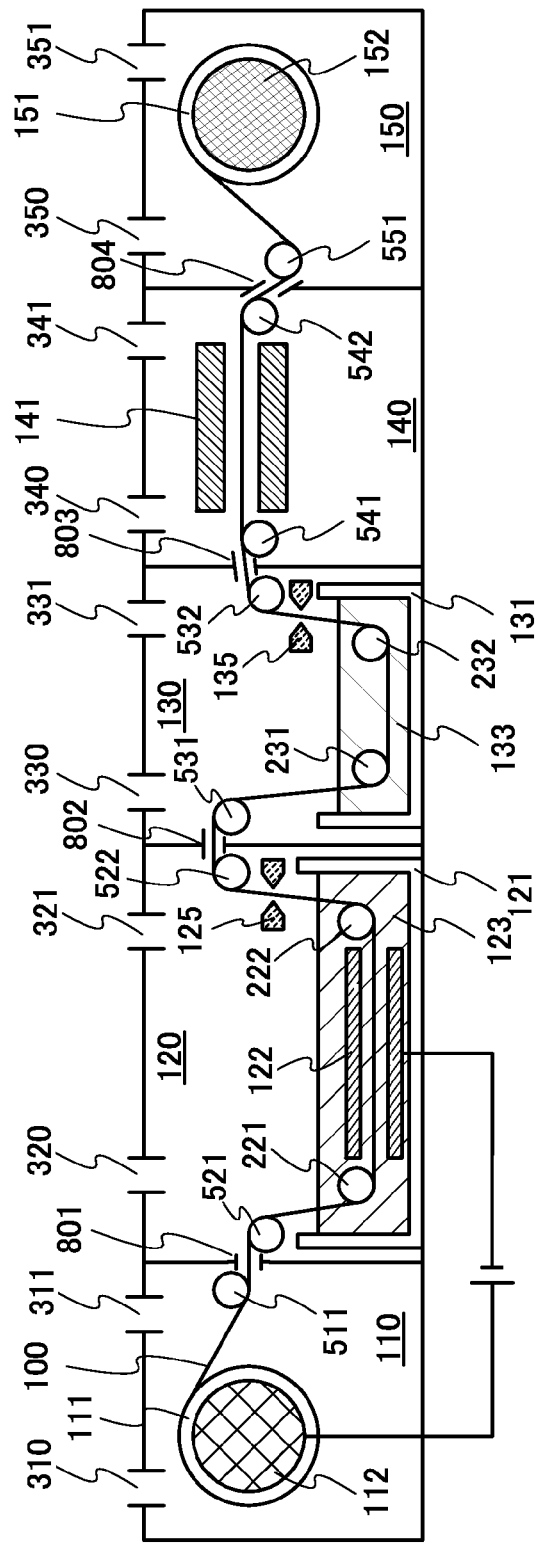
FIG. 3 illustrates a flexible substrate processing apparatus of one embodiment of the present invention.

Instead of the nip rollers 201, 202, 203, and 204 in FIG. 1, slits 801, 802, 803, and 804 illustrated in FIG. 3 may be used. The slits are preferably adjusted to have a width including a margin in consideration of the amount of curling at the time when tension is applied to the flexible substrate, in addition to the thicknesses of the flexible substrate and the film-like structure body formed on the flexible substrate.

In the structure using the slits, rollers 511, 521, 522, 531, 532, 541, 542, and 551 need to be provided so that the flexible substrate passes through the centers of the slits. For this reason, the structure of the apparatus is slightly more complicated than the structure including the nip rollers but is free from pressure applied by nip rollers and has a low load on the flexible substrate and the film-like structure body. Thus, the structure using the slits is employed for a flexible substrate or a film-like structure body which has a difficulty in strength, so that the quality and yield of a product to be manufactured can me improved.

Although not illustrated, a roller having a smaller contact area with the flexible substrate 100 may be omitted from each of the nip rollers 201, 202, 203, and 204. When one roller is provided between the chambers, the structure of the apparatus can be simpler.

The reduction treatment portion 120 and the washing portion 130 are preferably provided with blowing treatment portions 125 and 135, respectively, in the posterior locations of a carrying path of the flexible substrate. The blowing treatment portions can shortly dry the flexible substrate subjected to the steps in the reduction treatment portion 120 and the washing portion 130. Note that a mechanism that blows linear airflow on opposite surfaces of the flexible substrate is preferably used as the blowing treatment portion.

Next, specific descriptions will be given of the structures of the substrate carrying-out portion 110, the reduction treatment portion 120, the washing portion 130, the drying portion 140, and the substrate carrying-in portion 150 in FIG. 1.

The substrate carrying-out portion 110 has the first chamber 101, the inlet 310, the outlet 311, and an unwinder 112 provided with a first bobbin 111 around which the flexible substrate 100 is wound. The nip rollers 201 are provided between the substrate carrying-out portion 110 and the reduction treatment portion 120.

The reduction treatment portion 120 has the second chamber 102, the inlet 320, the outlet 321, the blowing treatment portion 125, and a first bath 121. In the first bath 121, an electrolyte 123, first rollers 221 and 222 that support the flexible substrate 100, and a first electrode 122 that is located in parallel with the flexible substrate 100 supported by the first rollers 221 and 222 are provided. Note that a mechanism used to introduce and remove the electrolyte 123 is preferably provided in the first bath 121 so that the electrolyte 123 can be introduced after replacement of an atmosphere in the second chamber 102.

Further, it is preferable that the first electrodes 122 be provided on both the top surface side and the bottom surface side of the flexible substrate 100 so as to be parallel to and uniformly apart from the flexible substrate 100 as illustrated in the drawing. In the case where the film-like structure body is formed on only one of the surfaces of the flexible substrate, however, the first electrode 122 may be provided only on the side of the surface where the film-like structure body is formed. The nip rollers 202 are provided between the reduction treatment portion 120 and the washing portion 130. Although a roller 212 that adjusts the positional relation between the flexible substrate 100 and the blowing treatment portion 125 is provided between the first roller 222 and the nip rollers 202, the roller 212 can be omitted.

The washing portion 130 has the third chamber 103, the inlet 330, the outlet 331, the blowing treatment portion 135, and a second bath 131. In the second bath 131, a washing solution 133 and second rollers 231 and 232 that support the flexible substrate 100 are provided. Note that a mechanism used to introduce and remove the washing solution 133 is preferably provided in the second bath 131 so that the washing solution 133 can be introduced after replacement of an atmosphere in the third chamber 103. The nip rollers 203 are provided between the washing portion 130 and the drying portion 140. Although a roller 213 that adjusts the positional relation between the flexible substrate 100 and the blowing treatment portion 135 is provided between the second roller 232 and the nip rollers 203, the roller 213 can be omitted. Although not illustrated, an ultrasonic generator may be further provided as needed in order to increase the washing effect. A fold-back roller may be additionally provided between the second rollers 231 and 232 so that the flexible substrate 100 is soaked for a longer time.

The drying portion 140 has the fourth chamber 104, the inlet 340, the outlet 341, and a drying means 141. For the drying means 141, one of hot-air heating, lamp heating, induction heating, air blowing, and the like or a combination of two or more of the above can be employed. The nip rollers 204 are provided between the drying portion 140 and the substrate carrying-in portion 150.

The substrate carrying-in portion 150 has the fifth chamber 105, the inlet 350, the outlet 351, and a winder 152 provided with a second bobbin 151 which takes up the flexible substrate 100.

Here, although the first electrode 122 serves as one of electrodes needed to electrochemically reduce an oxide contained in the film-like structure body formed on the flexible substrate 100 and the first bobbin 111 serves as a second electrode, a counter electrode, in FIG. 1, one embodiment of the present invention is not limited thereto. Practically, the flexible substrate 100 for which metal foil is used serves as the second electrode. Thus, any component of the flexible substrate processing apparatus can serve as the second electrode as long as the component is in contact with the flexible substrate 100 and at the same potential as the flexible substrate 100. Alternatively, some of the components can serve as the second electrode.

The component other than the first bobbin 111, which can serve as the second electrode, is the second bobbin 151, the first roller 221 or 222, the second roller 231 or 232, or the like. Note that the nip roller 201, 202, 203, or 204, or the roller 212 or 213 may serve as the second electrode. Although not illustrated, a roller, a brush, or the like that serves only as the second electrode may be provided in contact with the flexible substrate 100.

The second electrode needs to stably supply a potential to the flexible substrate 100; therefore, it is necessary that the component of the flexible substrate processing apparatus, which can be used as the second electrode, have a conductive region connected to a power source and a contact portion where the conductive region is in direct contact with the flexible substrate 100.

For this reason, the component of the flexible substrate processing apparatus, which can be used as the second electrode, is preferably made of metal. The component can easily supply a potential to the flexible substrate 100 as the flexible substrate 100 is in contact with any part of the component. The case of using the nip rollers 201, 202, 203, or 204 as the second electrode needs a structure where an end portion of the roller is not covered with a silicon rubber so that the vicinity of the end portion of the roller is in contact with the flexible substrate 100.

In order to electrochemically reduce the oxide contained in the film-like structure body formed on the flexible substrate 100, the first electrode 122 and the second electrode are used as a cathode and an anode, respectively.

Next, a description will be given of a process of electrochemically reducing an oxide with the use of the flexible substrate processing apparatus in FIG. 1.

First, the film-like structure body containing an oxide is formed on the flexible substrate 100 made of metal foil or the like, and the flexible substrate 100 is made to be in contact with a first bobbin 111 made of metal and taken up. At this time, the first bobbin 111 is in the state of being electrically connected to the power source and at the same potential as the flexible substrate 100. In order to cut waste, the flexible substrate 100 wound around the first bobbin 111 preferably has dummy regions (where the film-like structure body is not formed) with a length equal to or substantially equal to the length of the path of the flexible substrate 100 in the apparatus, at the portion where the winding is started and the portion where the winding is completed. Note that FIG. 1 does not illustrate the film-like structure body.

Then, the first bobbin 111 around which the flexible substrate 100 is wound is mounted on the unwinder 112 in the substrate carrying-out portion 110. Subsequently, the flexible substrate 100 is carried through the path shown in FIG. 1 in the reduction treatment portion 120, the washing portion 130, and the drying portion 140, and fixed to the second bobbin 151 mounted on the winder 152 in the substrate carrying-in portion 150. After that, a certain tension is applied to the flexible substrate 100 between the unwinder 112 and the winder 152.

Then, a replacement gas such as a rare gas with a low dew point is introduced from the inlets 310, 320, 330, 340, and 350 to replace the atmospheres in the first to fifth chambers 101 to 105. Note that the replacement gases are preferably introduced continuously.

Then, the electrolyte 123 is introduced into the first bath 121 so that the flexible substrate 100 and the first electrode 122 are soaked therein. The washing solution 133 is introduced into the second bath 131 so that the flexible substrate 100 is soaked therein. Note that the same material as that of the electrolyte 123 can be used for the washing solution 133.

Then, a certain reduction potential at which the oxide contained in the film-like structure body can be reduced is supplied to the first bobbin 111 serving as the second electrode, and the flexible substrate 100 is made to be at the same potential as the second electrode.

The blowing treatment portions 125 and 135 and the drying means 141 are operated. For the drying means 141, hot-air heating is employed here.

Then, the unwinder 112 and the winder 152 are operated to continuously carry the flexible substrate 100 unwound from the first bobbin 111, and continuous electrochemical reduction treatment of the oxide contained in the film-like structure body formed on the flexible substrate 100 is started.

The carrying speed of the flexible substrate 100 can be determined in consideration of the time needed for the electrochemical reduction treatment in the first bath 121.

The film-like structure body on the flexible substrate 100 unwound from the first bobbin 111 is carried from the first chamber 101 to the second chamber 102 through the nip rollers 201, and the electrochemical reduction treatment is performed in the first bath 121 during the carrying. The film-like structure body in which the electrochemical reduction of the oxide has been completed and the flexible substrate 100 are shortly dried by the blowing treatment portion 125 and carried from the second chamber 102 to the third chamber 103 through the nip rollers 202.

The film-like structure body and the flexible substrate 100 are washed in the second bath 131, shortly dried by the blowing treatment portion 135, and then carried from the third chamber 103 to the fourth chamber 104 through the nip rollers 203.

In the fourth chamber 104, the film-like structure body and the flexible substrate 100 are sufficiently dried by hot-air heating. Then, the film-like structure body and the flexible substrate 100 are carried from the fourth chamber 104 to the fifth chamber 105 through the nip rollers 204 and taken up by the second bobbin 151. The above steps are successively performed, whereby the reduction treatment of the oxide contained in the film-like structure body formed on long length of the flexible substrate 100 is completed.

Although the process where the flexible substrate 100 is continuously carried from the first bobbin 111 is described above, the flexible substrate 100 may be intermittently carried from the first bobbin 111.

In the case where the flexible substrate 100 is intermittently unwound, it is preferable to adjust the components of the reduction treatment portion 120, the washing portion 130, and the drying portion 140, the interval at which the film-like structure bodies are formed on the flexible substrate 100, and the like so that an electrochemical reduction process, a washing process, and a drying process are performed on all the film-like structure bodies formed on the flexible substrate 100 in the same manner.

In the case where the flexible substrate 100 is intermittently carried, the reduction potential to be supplied to the second electrode can be swept. Sweeping the reduction potential makes it possible to increase the reduction rate of an oxide having a variety of oxidized forms.

Although the flexible substrate processing apparatus described above has a structure dedicated to reduction treatment of the oxide contained in the film-like structure body formed on the flexible substrate, one embodiment of the present invention is not limited thereto.

Figure 4:
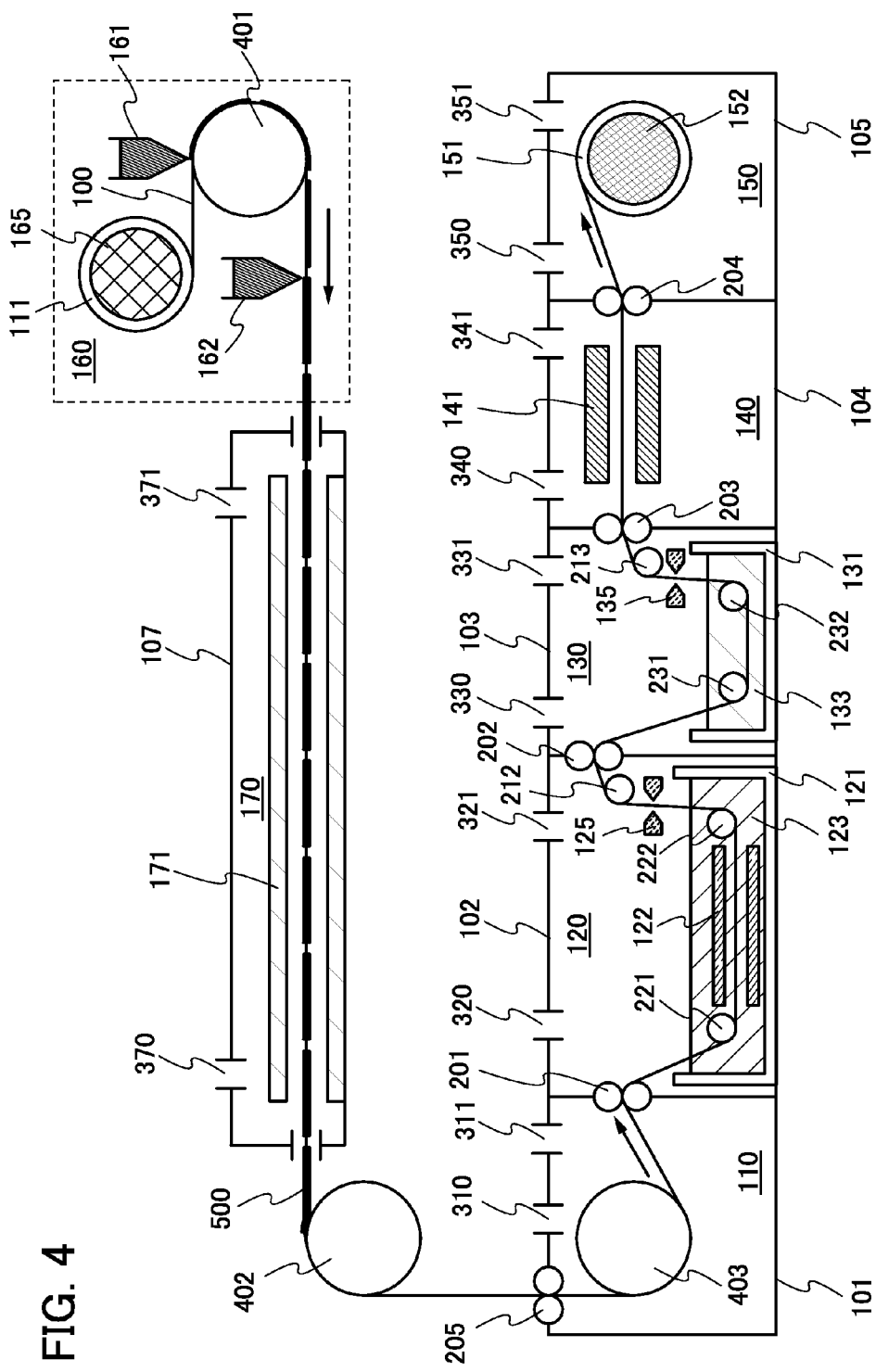
FIG. 4 illustrates a flexible substrate processing apparatus of one embodiment of the present invention.

For example, a structure for forming a film-like structure body containing an oxide on a flexible substrate and the structure for performing a series of electrochemical reduction treatment steps, which is illustrated in FIG. 1, may be combined as illustrated in FIG. 4. Although a component serving as the second electrode is not specified in FIG. 4, any of the components which can serve as the second electrode as described above may be used as the second electrode.

The structure for forming a film-like structure body containing an oxide on a flexible substrate, which is illustrated in FIG. 4, includes a film-like structure body forming portion 160 where a film-like structure body 500 is attached to the flexible substrate 100 and a film-like structure body drying portion 170 where the film-like structure body 500 attached to the flexible substrate 100 is dried.

The film-like structure body forming portion 160 includes an unwinder 165 provided with the first bobbin 111 around which the flexible substrate 100 is wound, a roller 401, a first film-like structure body attaching means 161, and a second film-like structure body attaching means 162. The unwinder 165 may be provided separately from the film-like structure body forming portion 160. In the case where a film-like structure body is formed only on one of the top surface side and the bottom surface side of the flexible substrate 100, one of the first film-like structure body attaching means 161 and the second film-like structure body attaching means 162 may be omitted. Examples of such a film-like structure body attaching means include a slot die coater, a lip coater, a blade coater, a reverse coater, and a gravure coater. The number of rollers used to reverse the flexible substrate 100 may be increased depending on the kind of the coater used. Alternatively, a dip method, a spray method, or the like can be employed.

Although not illustrated, a sixth chamber having the above structure, and an inlet and an outlet which are used for replacement of an atmosphere in the sixth chamber may be provided as needed.

The film-like structure body drying portion 170 has a seventh chamber 107, an inlet 370, an outlet 371, and a drying means 171. For the drying means 171, one of hot-air heating, lamp heating, induction heating, air blowing, and the like or a combination of two or more of the above can be employed.

Although a roller 402 that adjusts the carrying path of the flexible substrate 100 is provided between the film-like structure body drying portion 170 and the substrate carrying-out portion 110 in FIG. 4, the roller 402 is unnecessary in some cases depending on the positional relation between the film-like structure body drying portion 170 and the substrate carrying-out portion 110. A structure may be employed in which the substrate carrying-out portion 110 is omitted and the film-like structure body drying portion 170 and the reduction treatment portion 120 are connected to each other. The structure in FIG. 4 is different from that in FIG. 1 in that the first chamber 101 of the substrate carrying-out portion 110 is provided with nip rollers 205 serving as an introduction portion of the flexible substrate 100 and a roller 403 is provided instead of the unwinder 112. That is to say, the substrate carrying-out portion 110 functions as a transit portion through which the substrate is carried.

Next, processes performed in the film-like structure forming portion 160 and the film-like structure body drying portion 170 will be described. In this embodiment, a liquid mixture in which an oxide, an organic compound, a metal compound, or the like is mixed into a material which is used for the film-like structure body and the mixture is dried, whereby the film-like structure body is formed. The mixture may be either in a paste form or in a gel form.

First, the mixture is supplied to one surface of the flexible substrate 100 unwound from the first bobbin 111 so that the mixture has a film form, with the use of the first film-like structure body attaching means 161. Then, the flexible substrate 100 is reversed by the roller 401, and the mixture is supplied to the opposite surface of the flexible substrate 100 so as to have a film form, with the use of the second film-like structure body attaching means 162.

The film-like mixture formed on the flexible substrate 100 is carried to the seventh chamber 107 and dried by the drying means 171 during the carrying, so that the film-like structure body 500 is obtained.

The film-like structure body 500 formed on the flexible substrate 100 is sequentially carried to the first to fifth chambers 101 to 105 while being subjected to the steps described above, and taken up by the second bobbin 151. In this manner, formation of the film-like structure body 500 containing an oxide on the flexible substrate 100 and electrochemical reduction treatment of the oxide contained in the film-like structure body 500 can be successively performed.

The flexible substrate processing apparatus of one embodiment of the present invention may have the structure for performing a series of electrochemical reduction treatment steps on the oxide contained in the film-like structure body formed on the flexible substrate 100, which is illustrated in FIG. 1, and a structure used to form a stack of the flexible substrate and other plural flexible substrates.

Figure 5:
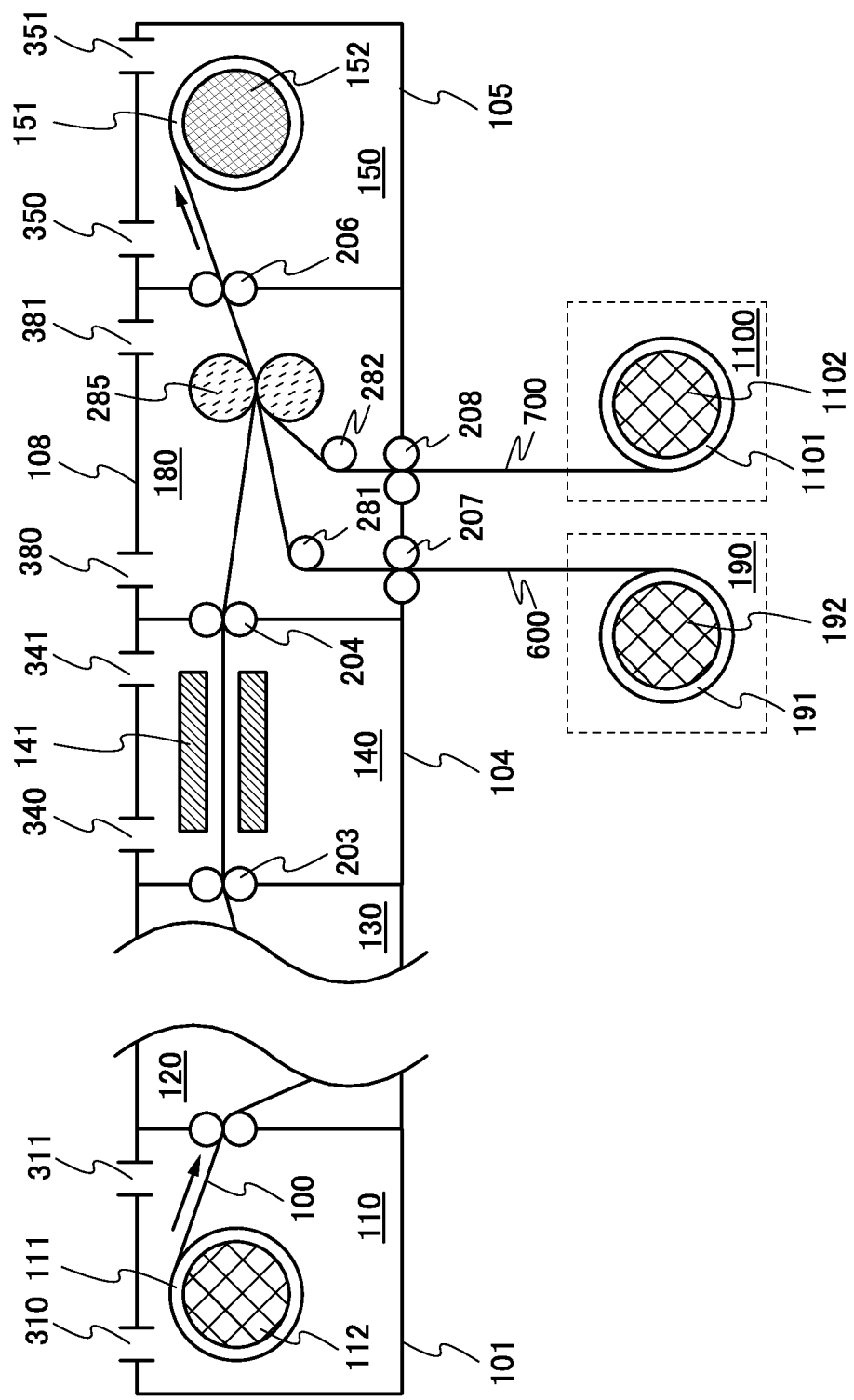
FIG. 5 illustrates a flexible substrate processing apparatus of one embodiment of the present invention.

For example, a structure illustrated in FIG. 5 may be employed in which a stacking portion 180 that forms a stack of the flexible substrate subjected to treatment in the apparatus with the structure in FIG. 1 and plural flexible substrates other than the flexible substrate is provided between the drying portion 140 and the substrate carrying-in portion 150. Note that any of the other plural flexible substrates may be provided with a film-like structure body.

The stacking portion 180 has an eighth chamber 108, an inlet 380, an outlet 381, nip rollers 207 and 208, rollers 281 and 282, and rollers 285 used to form a stack. Although FIG. 5 illustrates an example where a total of three kinds of substrates are introduced into the stacking portion 180, the components of the stacking portion 180 are not limited to the above components as long as the plural substrates can be introduced to a crimping portion of the roller 285 used to form a stack.

A substrate supply portion 190 includes at least an unwinder 192 provided with a third bobbin 191, and a flexible substrate 600 is wound around the third bobbin 191. A substrate supply portion 1100 includes at least an unwinder 1102 provided with a fourth bobbin 1101, and a flexible substrate 700 is wound around the fourth bobbin 1101. Note that although FIG. 5 illustrates an example where flexible substrates are supplied from two structures of the substrate supply portion 190 and the substrate supply portion 1100 to the stacking portion 180, there is no limitation on the number of structures which supply flexible substrates to the stacking portion 180.

The flexible substrate 600 and the flexible substrate 700 which are supplied from the substrate supply portion 190 and the substrate supply portion 1100 to the eighth chamber 108 are introduced to the crimping portion of the roller 285 used to form a stack, with the flexible substrate 600 and the flexible substrate 700 overlapping with the flexible substrate 100. Note that in this step, bonding of the flexible substrates and the film-like structure bodies may also be performed as well as the formation of the stack thereof. In the case where such bonding is performed, an adhesive supply portion, a pressure bonding portion, a heating portion of the roller 285 used to form a stack, and the like may be provided.

The stack of the flexible substrates 100, 600, and 700 is carried to the substrate carrying-in portion 150 through the nip rollers 206 and taken up by the second bobbin 151. In the above manner, the electrochemical reduction treatment of the oxide contained in the film-like structure body formed on the flexible substrate 100 and the formation of the stack of the flexible substrates 100, 600, and 700 can be performed in succession.

Figure 6:
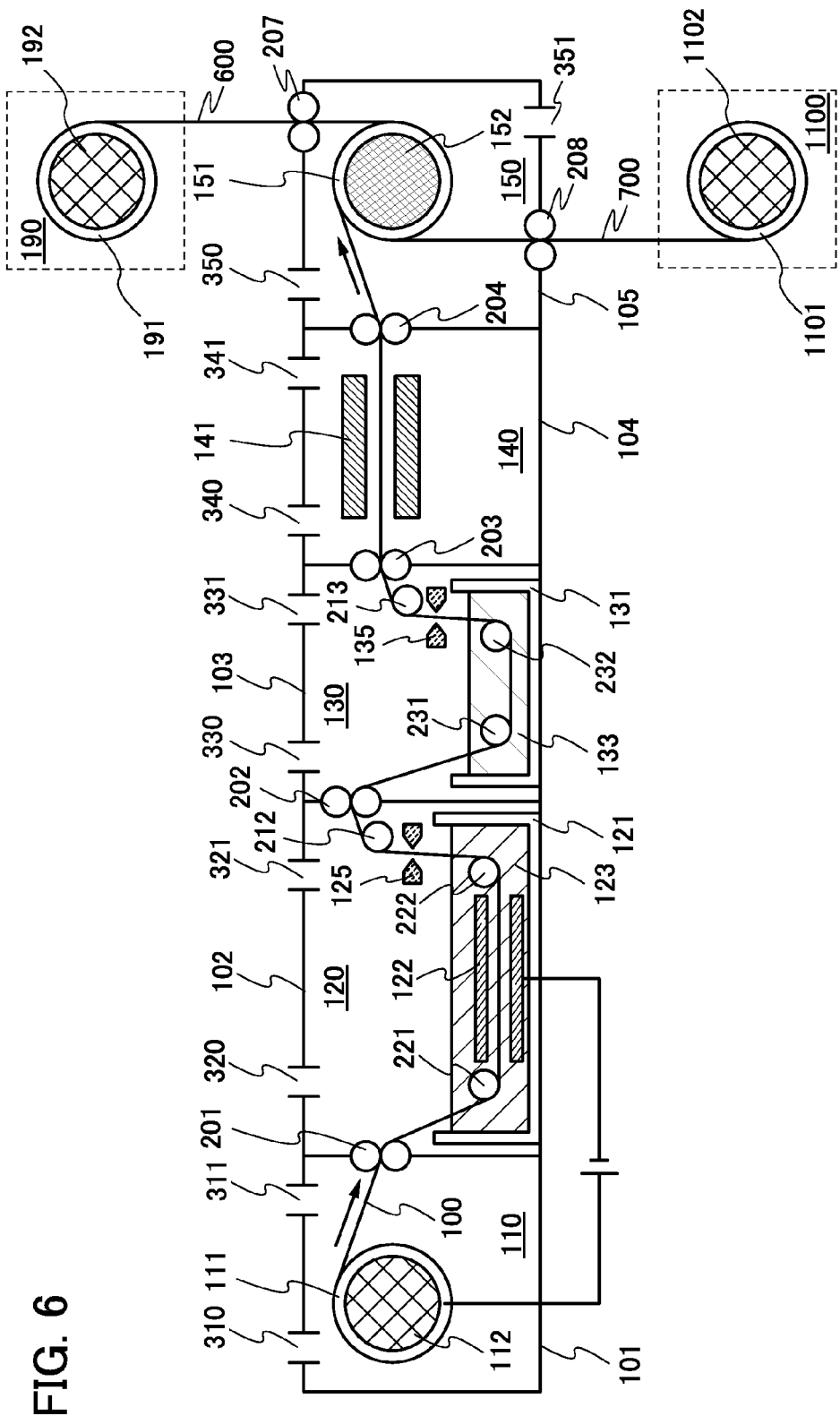
FIG. 6 illustrates a flexible substrate processing apparatus of one embodiment of the present invention.

A structure illustrated in FIG. 6, a modification example of the structure in FIG. 5, may be employed. With the apparatus structure in FIG. 6 where the fifth chamber 105 is provided with the nip rollers 207 and 208, the flexible substrates 600 and 700 are supplied from the substrate supply portion 190 and the substrate supply portion 1100 directly to the fifth chamber 105 to be taken up by the second bobbin 151.

Although the structure in FIG. 1 is used in the structures in FIGS. 4 to 6, the structure in FIG. 2A, 2B, or 2C or FIG. 3 may be used instead of the structure in FIG. 1. A combination of the structure in FIG. 4 and the structure in FIG. 5 may be used. The substrate supply portion 190 and the substrate supply portion 1100 in FIGS. 5 and 6 may have the structure in FIG. 1 or the structure in FIG. 4.

According to one embodiment of the present invention described above, a flexible substrate processing apparatus having a structure which allows stable reduction treatment of an oxide contained in a film-like structure body formed on a flexible substrate can be provided.

The flexible substrate processing apparatus of one embodiment of the present invention can be used for, for example, a process of efficiently manufacturing power storage devices such as lithium secondary batteries.

For example, the apparatus having the structure in FIG. 1, FIG. 2A, 2B, or 2C, or FIG. 3 makes it possible to electrochemically reduce graphene oxide contained in a film-like structure body formed on a flexible substrate to form graphene. The graphene can be used as a positive electrode material or a negative electrode material.

The apparatus having the structure in FIG. 4 enables a step of forming a film-like structure body using a mixture of graphene oxide, an electrode active material, a binder, and the like and a step of electrochemically reducing the graphene oxide contained in the film-like structure body to be performed successively.

The apparatuses having the structures in FIG. 5 and FIG. 6 allow the electrochemical reduction of graphene oxide contained in a film-like structure body formed on a flexible substrate for, for example, the formation of a positive electrode and the formation of a stack of the positive electrode, a separately-prepared separator, and a separately-prepared negative electrode formed on a flexible substrate, so that a basic structure of a power storage device can be efficiently manufactured.

This embodiment can be implemented in appropriate combination with any of the other embodiments.

(Embodiment 2)

Figure 7A:
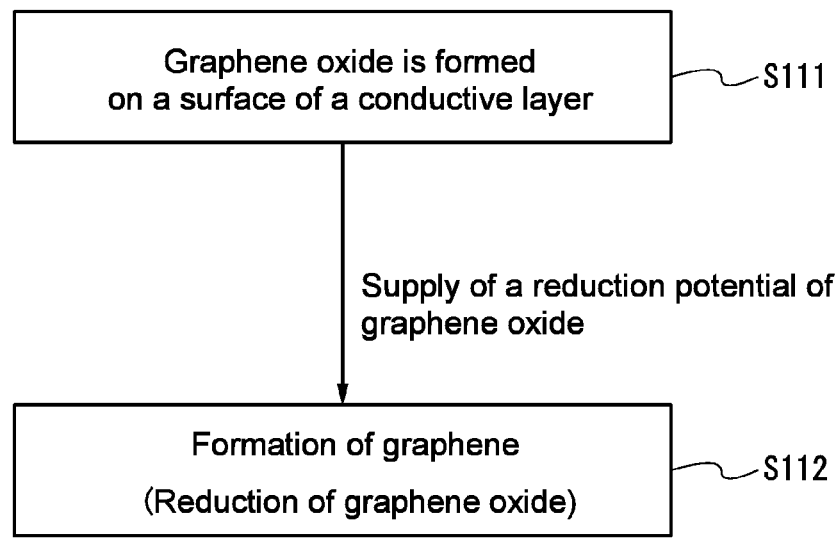
FIG. 7A shows a formation method of graphene and FIG. 7B illustrates an apparatus used for the method.
Figure 7B:
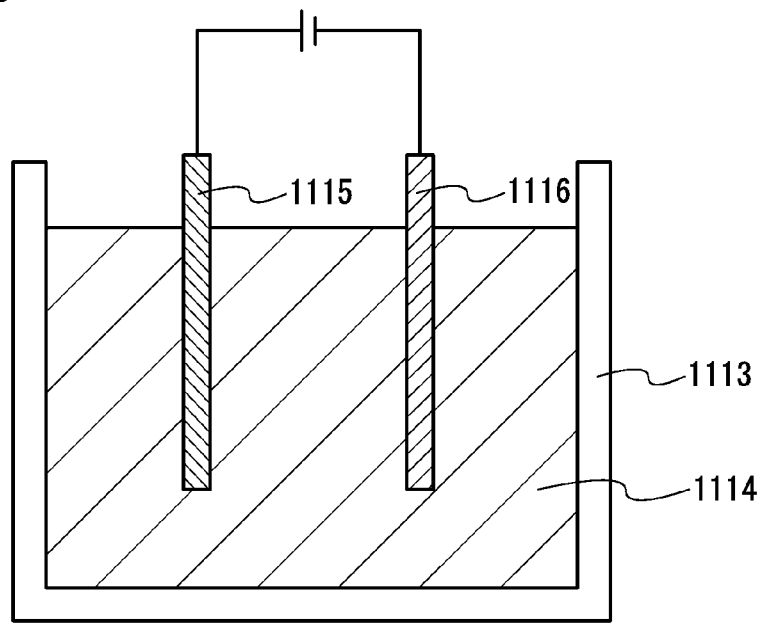

In this embodiment, a basic formation method of graphene, a material which can be formed according to one embodiment of the present invention, will be described. Note that FIG. 7A shows a process of forming graphene, and FIG. 7B illustrates an apparatus used to experimentally form graphene.

Note that graphene in this specification refers to single-layer graphene or multilayer graphene including two or more and hundred or less layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely removed and part of the oxygen remains in the graphene. When the graphene contains oxygen, the proportion of the oxygen is higher than or equal to 2% and lower than or equal to 20%, preferably higher than or equal to 3% and lower than or equal to 15%.

A feature of the method for forming graphene of this embodiment is that in formation of graphene, graphene oxide is not reduced through heat treatment but electrochemically reduced with electric energy.

<Step S111>

In Step S111 in FIG. 7A, graphene oxide is formed on a surface of a conductive layer. For example, a dispersion liquid containing graphene oxide is applied to the conductive layer. As the dispersion liquid containing graphene oxide, a commercial product or a dispersion liquid obtained by dispersing graphene oxide formed by a method shown in FIG. 8, or the like, in a solvent may be used. Alternatively, a dispersion liquid obtained by dispersing graphene oxide (graphene oxide salt) formed by another method described below in a solvent may be used.

The conductive layer can be formed using any material as long as the material has conductivity. For example, a metal material such as aluminum (Al), copper (Cu), nickel (Ni), or titanium (Ti) or an alloy material containing some of the above metal materials can be used. Examples of the alloy material include an Al—Ni alloy and an Al—Cu alloy. The conductive layer can have a foil shape, a plate shape, a net shape, or the like as appropriate, and the metal material or the alloy material which is formed over a substrate and separated may be used as the conductive layer.

As a method of applying the dispersion liquid containing graphene oxide to the conductive layer, a coating method, a spin coating method, a dip coating method, a spray coating method, and the like can be given. Alternatively, these methods may be combined as appropriate. For example, after the dispersion liquid containing graphene oxide is applied to the conductive layer by a dip coating method, the conductive layer is rotated as in a spin coating method, so that the evenness of the thickness of the applied dispersion liquid containing graphene oxide can be improved.

After the dispersion liquid containing graphene oxide is applied to the conductive layer, the solvent in the dispersion liquid is removed. For example, drying is performed in vacuum, in the atmosphere, or in a controlled atmosphere for a certain period of time to remove the solvent from the dispersion liquid containing graphene oxide which is applied to the conductive layer. Note that time needed for drying depends on the amount of applied dispersion liquid. The drying may be performed while heating is performed as long as the graphene oxide is not reduced. For example, to make the thickness of the graphene oxide after Step S111 approximately 10 μm, it is preferable to perform drying for approximately one hour while the conductive layer is heated at a temperature higher than or equal to room temperature and lower than or equal to 100° C. and then to perform drying at room temperature for approximately one hour.

<Step S112>

Next, the graphene oxide formed on the conductive layer is reduced to form graphene. In this step, the graphene oxide is electrochemically reduced using electric energy as described above to form graphene. When this step is schematically described, in this step, a closed circuit is formed with the use of the conductive layer provided with the graphene oxide, which is obtained in Step S111, and a potential at which the reduction reaction of the graphene oxide occurs or a potential at which the graphene oxide is reduced is supplied to the conductive layer, so that the graphene oxide is reduced to form graphene. Note that in this specification, a potential at which the reduction reaction of the graphene oxide occurs or a potential at which the graphene oxide is reduced is referred to as the reduction potential.

A method for reducing the graphene oxide with the use of a structure in FIG. 7B will be specifically described. A container 1113 is filled with an electrolyte 1114, and a conductive layer 1115 provided with the graphene oxide and a counter electrode 1116 are put in the container 1113 so as to be immersed in the electrolyte 1114. In this step, an electrochemical cell (open circuit) is formed with the use of at least the counter electrode 1116 and the electrolyte 1114 besides the conductive layer 1115 provided with the graphene oxide, which is obtained in Step S111, as a working electrode, and the reduction potential of the graphene oxide is supplied to the conductive layer 1115 (working electrode), so that the graphene oxide is reduced to form graphene. Note that the reduction potential to be supplied is a reduction potential in the case where the potential of the counter electrode 1116 is used as a reference potential or a reduction potential in the case where a reference electrode is provided in the electrochemical cell and the potential of the reference electrode is used as a reference potential. For example, when the counter electrode 1116 and the reference electrode are each made of lithium metal, the reduction potential to be supplied is a reduction potential determined relative to the redox potential of the lithium metal (vs. $Li/Li^+$). Through this step, reduction current flows through the electrochemical cell (closed circuit) when the graphene oxide is reduced. Thus, to examine whether the graphene oxide is reduced, the reduction current needs to be checked sequentially; the state where the reduction current is below a certain value (where there is no peak corresponding to the reduction current) is regarded as the state where the graphene oxide is reduced (where the reduction reaction is completed).

In controlling the potential of the conductive layer 1115 in this step, the potential of the conductive layer 1115 may be fixed to the reduction potential of the graphene oxide or may be swept so as to include the reduction potential of the graphene oxide. Further, the sweeping may be periodically repeated like in cyclic voltammetry. Although there is no limitation on the sweep rate of the potential of the conductive layer 1115, it is preferably higher than or equal to 0.005 mV/s and lower than or equal to 1 mV/s. Note that the potential of the conductive layer 1115 may be swept either from a higher potential to a lower potential or from a lower potential to a higher potential.

Although the reduction potential of the graphene oxide slightly varies depending on the structure of the graphene oxide (e.g., the presence or absence of a functional group and formation of graphene oxide salt) and the way to control the potential (e.g., the sweep rate), it is approximately 2.0 V (vs. $Li/Li^+$).

Through the above steps, the graphene can be formed on the conductive layer 1115.

Next, description will be given of a principle that electrochemical reduction of the graphene oxide with the use of electric energy makes reduction current flow in the method for forming graphene. Here, the potential of the conductive layer is swept from a higher potential to a lower potential so as to include the reduction potential of the graphene oxide.

As the potential of the conductive layer is swept from a higher potential to a lower potential, the Fermi level of the conductive layer is raised. When the Fermi level becomes higher than the lowest unoccupied molecular orbital (LUMO) level of the graphene oxide formed on the conductive layer, electrons are supplied to the LUMO level of the graphene oxide from the conductive layer. Accordingly, the graphene oxide receives the electrons and is reduced to form graphene. That is to say, the transfer of the electrons is suggested by the reduction current. Thus, by sequentially checking the reduction current, whether the reduction reaction of the graphene oxide is completed can be determined.

In the graphene formed by the method for forming graphene with the use of electrochemical reduction reaction, the proportions of carbon atoms and oxygen atoms, which are measured by X-ray photoelectron spectroscopy (XPS), are greater than or equal to 80% and less than or equal to 90% and greater than or equal to 10% and less than or equal to 20%, respectively. The proportion of $sp^2$-bonded carbon atoms of the carbon atoms is greater than or equal to 50% and less than or equal to 70%.

As a method for reducing graphene oxide, other than a method of electrochemical reduction with electric energy, a method of causing reduction by releasing oxygen atoms in graphene oxide as carbon dioxide through heat treatment (also referred to as thermal reduction). The graphene formed by electrochemical reduction is different from graphene formed by thermal reduction in at least the following points. In the graphene formed by electrochemical reduction, the proportion of $C(sp^2)$-$C(sp^2)$ double bonds is higher than that in graphene formed by thermal reduction. Thus, the graphene formed by electrochemical reduction has more $\pi$ electrons which are not localized in a particular position and are broadly conducive to carbon-carbon bonds than graphene formed by thermal reduction, which suggests that the graphene of one embodiment of the present invention has higher conductivity than graphene formed by thermal reduction.

In the method for forming graphene oxide in FIG. 8, a large amount of water is necessary in Step S103, the step of washing graphene oxide. When Step S103 is repeated, acid can be removed from graphite oxide. However, when the acid content thereof becomes low, it is difficult to separate the graphite oxide, which is a precipitate, and acid contained in a supernatant fluid; accordingly, the yield of the graphite oxide may probably be low, leading to a lower yield of graphene.

Here, a method for forming graphene oxide which is different from the method in FIG. 8 in Step S111 will be described.

Figure 9:
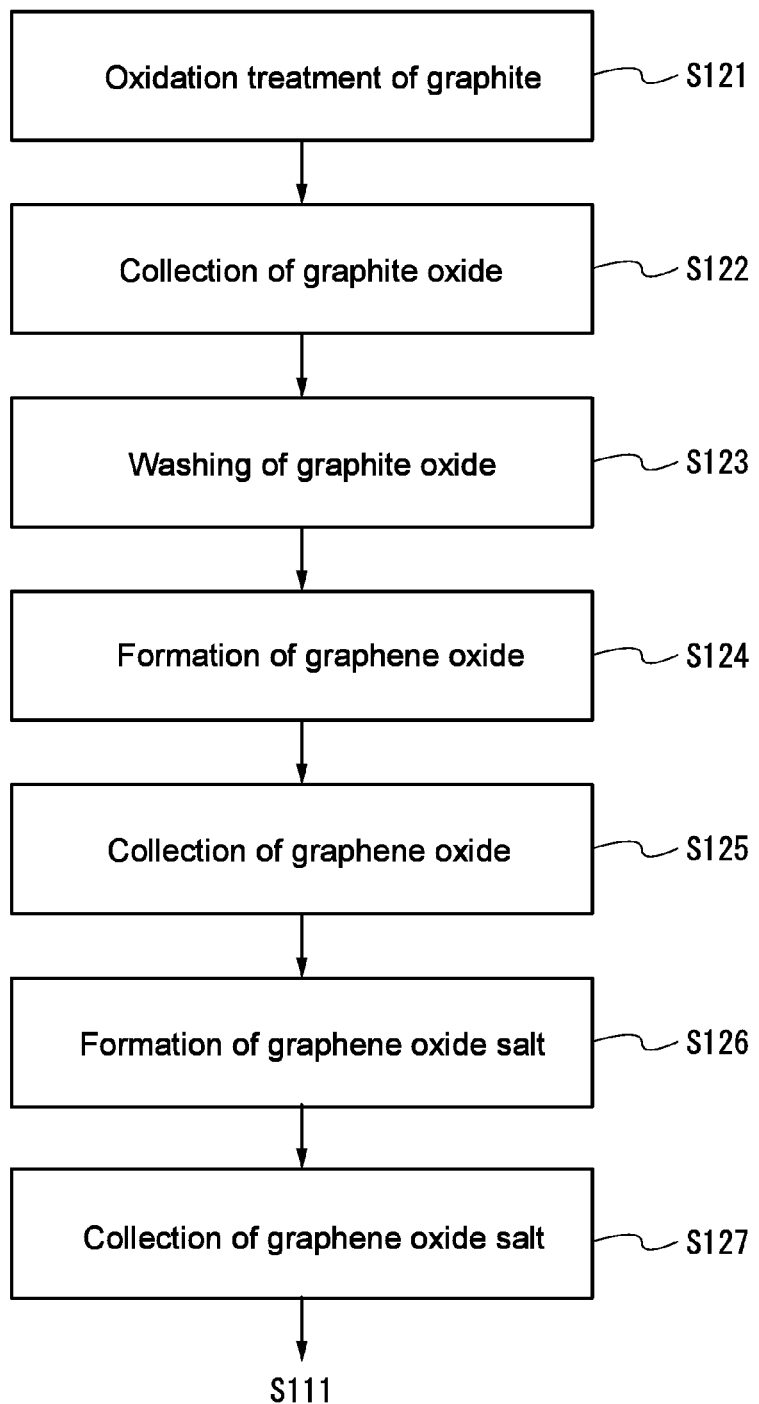
FIG. 9 shows a formation method of graphene oxide.

FIG. 9 is a flow chart showing a process of forming graphene oxide (or graphene oxide salt).

<Oxidation Treatment of Graphite>

As shown in Step S121, graphite is oxidized with an oxidizer to form graphite oxide.

As an oxidizer, sulfuric acid, nitric acid and potassium chlorate; sulfuric acid and potassium permanganate; or potassium chlorate and fuming nitric acid are used. Here, graphite is oxidized by mixing graphite with sulfuric acid and potassium permanganate. Further, water is added thereto, whereby a mixed solution 1 containing the graphite oxide is formed.

After that, in order to remove the remaining oxidizer, hydrogen peroxide and water may be added to the mixed solution 1. Unreacted potassium permanganate is reduced by the hydrogen peroxide and then the reduced potassium permanganate is reacted with sulfuric acid, whereby manganese sulfate can be formed. Since the manganese sulfate is aqueous, it can be separated from the graphite oxide insoluble in water.

<Collection of Graphite Oxide>

Next, as shown in Step S122, the graphite oxide is collected from the mixed solution 1. The mixed solution 1 is subjected to at least one of filtration, centrifugation, dialysis, and the like, so that a precipitate 1 containing the graphite oxide is collected from the mixed solution 1. Note that the precipitate 1 contains unreacted graphite.

<Washing of Graphite Oxide>

Next, as shown in Step S123, a metal ion and a sulfate ion are removed from the precipitate 1 containing the graphite oxide with an acid solution. Here, metal ion derived from the oxidizer, which is contained in the graphite oxide, are dissolved in the acid solution, whereby the metal ion and sulfate ion can be removed from the graphite oxide.

The graphite oxide contains a functional group such as an epoxy group, a carbonyl group such as a carboxy group, or a hydroxy group in the acid solution because an oxygen atom is bonded to part of carbon atoms in graphite. Thus, the graphite oxide does not dissolve in the acid solution. On the other hand, the graphite oxide easily dissolves in a neutral solution or a basic solution due to the functional group such as an epoxy group, a carbonyl group such as a carboxy group, or a hydroxy group, which is contained in the graphite oxide, leading to a reduction in yield of graphene oxide and graphene oxide salt. For this reason, the acid solution is used to wash the graphite oxide. The use of an acid solution for the washing of the graphite oxide can increase the yields of graphene oxide and graphene oxide salt because it is not necessary to perform a washing step a plurality of times using a large amount of water unlike in the method in FIG. 8. That is to say, the method for forming graphene oxide in FIG. 9 can increase the productivity of graphene oxide, further, the productivity of graphene.

Typical examples of the acid solution include hydrochloric acid, dilute sulfuric acid, and nitric acid. Note that the graphite oxide is preferably washed with a highly-volatile acid typified by hydrochloric acid because the remaining acid solution is easily removed in a subsequent drying step.

As a method for removing a metal ion and a sulfate ion from the precipitate 1, there are a method in which the precipitate 1 and an acid solution are mixed and then a mixed solution is subjected to at least one of filtration, centrifugation, dialysis, and the like; a method in which the precipitate 1 is provided over filter paper and then an acid solution is poured on the precipitate 1; and the like. Here, the precipitate 1 is provided over filter paper, a metal ion and a sulfate ion are removed from the precipitate 1 by washing with the acid solution, and a precipitate 2 containing the graphite oxide is collected. Note that the precipitate 2 contains unreacted graphite.

<Formation of Graphene Oxide>

Next, as shown in Step S124, the precipitate 2 is mixed with water and a mixed solution 2 in which the precipitate 2 is dispersed is formed. Then, carbon layers containing oxygen in the graphite oxide contained in the mixed solution 2 are separated from each other, so that graphene oxides are dispersed. Examples of a method for separating the graphite oxide to form graphene oxides include application of ultrasonic waves and mechanical stirring. Note that the mixed solution in which the graphene oxides are dispersed is a mixed solution 3.

The graphene oxide formed through this process contains six-membered rings each composed of carbon atoms, which are connected in the planar direction, and many-membered rings such as a seven-membered ring, an eight-membered ring, a nine-membered ring, and a ten-membered ring. Note that the many-membered ring is formed when a carbon bond in part of a six-membered ring composed of carbon atoms is broken and the broken carbon bond is bonded to a carbon skeleton ring so that the number of carbon atoms in the carbon skeleton ring increases. A region surrounded with carbon atoms in the many-membered ring becomes a gap. An epoxy group, a carbonyl group such as a carboxy group, a hydroxy group, or the like is bonded to part of the carbon atoms in the six-membered ring and the many-membered ring. Note that instead of the dispersed graphene oxide, multilayer graphene oxide may be dispersed.

<Collection of Graphene Oxide>

Next, as shown in Step S125, the mixed solution 3 is subjected to at least one of filtration, centrifugation, dialysis, and the like, whereby a mixed solution containing the graphene oxide and a precipitate 3 containing the graphite are separated from each other and the mixed solution containing the graphene oxide is collected. Note that the mixed solution containing the graphene oxide is a mixed solution 4. In particular, graphene oxide containing a carbonyl group is ionized and different graphene oxides are more likely to be dispersed because hydrogen is ionized in a mixed solution having a polarity.

The mixed solution 4 formed through the above step can be used as the dispersion liquid used in Step S111 shown in FIG. 7A.

The mixed solution 4 may contain not a few impurities; thus, it is preferable to purify the graphene oxide contained in the mixed solution 4 formed in Step S125 in order to increase the purity of graphene. Specifically, it is preferable to perform Steps S126 and S127 after Step S125. Steps S126 and S127 will be described below.

<Formation of Graphene Oxide Salt>

As shown in Step S126, after a basic solution is mixed into the mixed solution 4 to form graphene oxide salt, an organic solvent is added, and a mixed solution 5 in which the graphene oxide salt is precipitated as a precipitate 4 is formed.

As the basic solution, it is preferable to use a mixed solution which contains a base that reacts with the graphene oxide in a neutralization reaction without removing an oxygen atom bonded to a carbon atom of the graphene oxide by reducing the graphene oxide. Typical examples of the basic solution include an aqueous sodium hydroxide solution, an aqueous potassium hydroxide solution, an aqueous ammonia solution, a methylamine solution, an ethanolamine solution, a dimethylamine solution, and a trimethylamine solution.

The organic solvent is used to precipitate the graphene oxide salt. Typical examples of the organic solvent include acetone, methanol, and ethanol.

<Collection of Graphene Oxide Salt>

Next, as shown in Step S127, the mixed solution 5 is subjected to at least one of filtration, centrifugation, dialysis, and the like, whereby the solvent and the precipitate 4 containing the graphene oxide salt are separated from each other, and the precipitate 4 containing the graphene oxide salt is collected.

Next, the precipitate 4 is dried to yield the graphene oxide salt.

When a suspension formed by dispersing the graphene oxide salt formed through the above steps in a solvent is used as the dispersion liquid in Step S111 shown in FIG. 7A, graphene can have higher purity.

Figure 10:
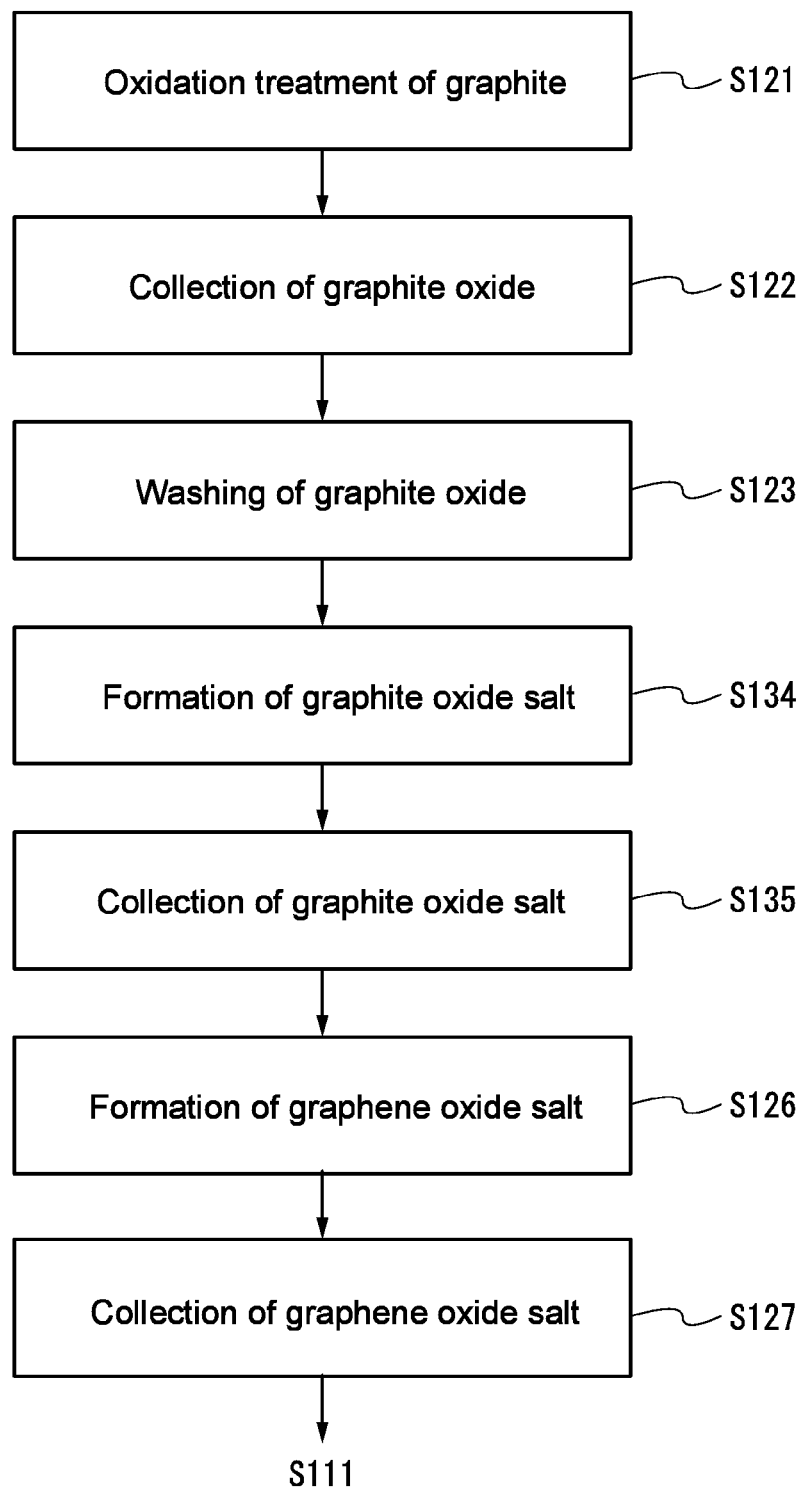
FIG. 10 shows a formation method of graphene oxide.

Note that in steps following Step S123 in FIG. 9, not graphene oxide but graphite oxide salt may be formed (Step S134), the graphite oxide salt may be collected (Step S135), and then graphene oxide salt may be formed, as shown in FIG. 10.

Step S134 is as follows. The precipitate 2 obtained in Step S123 is mixed with water, and then a basic solution is mixed into the mixture to form graphite oxide salt. After that, an organic solvent is added to the graphite oxide salt, and a mixed solution in which the graphite oxide salt is precipitated is formed. The basic solution can be selected from those used in Step S126, and the organic solvent can be selected from those used in Step S126.

In Step S135, the mixed solution in which the graphite oxide salt obtained in Step S134 is precipitated is subjected to at least one of filtration, centrifugation, dialysis, and the like, whereby the organic solvent and the precipitate containing the graphite oxide salt are separated from each other, and the precipitate containing the graphite oxide salt is collected.

The other steps in the method for forming graphene oxide salt in FIG. 10 are the same as those shown in FIG. 9.

According to this embodiment, graphene which has a higher proportion of $C(sp^2)$-$C(sp^2)$ double bonds and higher conductivity than graphene formed through heat treatment can be formed.

The method for forming graphene which is described in this embodiment can be applied to the structure of the flexible substrate processing apparatus of one embodiment of the present invention, which is described in Embodiment 1, conditions for operating the apparatus, and the like.

This embodiment can be implemented in appropriate combination with any of the other embodiments.

(Embodiment 3)

In this embodiment, a power storage device including graphene, a material which can be formed according to one embodiment of the present invention, will be described. Note that in this embodiment, description will be given assuming that the power storage device is a lithium secondary battery.

First, a positive electrode and a formation method thereof will be described.

Figure 11A:
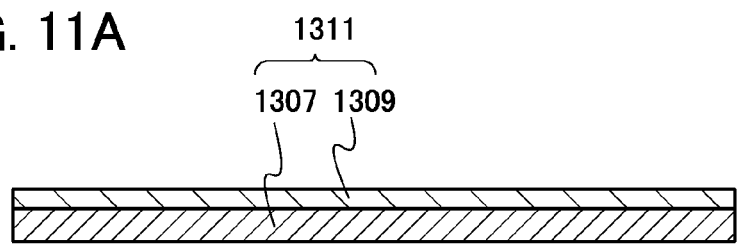
FIGS. 11A to 11C illustrate a positive electrode of a power storage device.
Figure 11B:
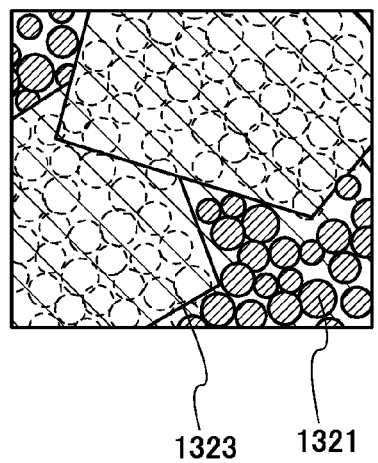

FIG. 11A is a cross-sectional view of a positive electrode 1311, and FIG. 11B is a plan view of part of a positive electrode active material layer 1309. In the positive electrode 1311, the positive electrode active material layer 1309 is formed over a positive electrode current collector 1307. The positive electrode active material layer 1309 contains at least a positive electrode active material 1321 and graphene 1323 and may further contain a binder, a conductive additive, and/or the like.

Note that an active material refers to a material that relates to insertion and extraction of ions serving as carriers (hereinafter referred to as carrier ions) in a power storage device. Thus, the active material and the active material layer including a material other than the active material are distinguished.

As the positive electrode current collector 1307, a material having high conductivity such as platinum, aluminum, copper, titanium, or stainless steel can be used. The positive electrode current collector 1307 can have a foil shape, a plate shape, a net shape, or the like as appropriate.

As a material of a positive electrode active material 1321 contained in the positive electrode active material layer 1309, $LiFeO_2$, $LiCoO_2$, $LiNiO_2$, or $LiMn_2O_4$, or $V_2O_5$, $Cr_2O_5$, $MnO_2$, or the like can be used.

Alternatively, an olivine-type lithium-containing composite oxide ($LiMPO_4$ (general formula) (M is one or more of Fe(II), Mn(II), Co(II), and Ni(II))) can be used for the positive electrode active material 1321. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\leq 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\leq 1$, $0<c<1$, $0<d<1$, and $0<e<1$), and $LiFe_fNi_gCo_hMn_iPO_4$ ($f+g+h+i\leq 1$, $0<f<1$, $0<g<1$, $0<h<1$, and $0<i<1$).

Alternatively, a lithium-containing composite oxide such as Li$_2$MSiO$_4$ (general formula) (M is one or more of Fe(II), Mn(II), Co(II), and Ni(II)) can be used for the positive electrode active material 1321. Typical examples of the general formula Li$_2$MSiO$_4$ which can be used as a material are lithium compounds such as Li$_2$FeSiO$_4$, Li$_2$NiSiO$_4$, Li$_2$COSiO$_4$, Li$_2$MnSiO$_4$, Li$_2$Fe$_k$Ni$_l$SiO$_4$, Li$_2$Fe$_k$CO$_l$SiO$_4$, Li$_2$Fe$_k$Mn$_l$SiO$_4$, Li$_2$Ni$_k$Co$_l$SiO$_4$, Li$_2$Ni$_k$Mn$_l$SiO$_4$ (k+l≤1, 0<k<1, and 0<l<1), Li$_2$Fe$_m$Ni$_n$Co$_q$SiO$_4$, Li$_2$Fe$_m$Ni$_n$Mn$_q$SiO$_4$, Li$_2$Ni$_m$Co$_n$Mn$_q$SiO$_4$ (m+n+q≤1, 0<m<1, 0<n<1, and 0<q<1), and Li$_2$Fe$_r$Ni$_s$Co$_t$Mn$_u$SiO$_4$ (r+s+t+u≤1, 0<r<1, 0<s<1, 0<t<1, and 0<u<1).

In the case where carrier ions are alkali metal ions other than lithium ions, alkaline-earth metal ions, beryllium ions, or magnesium ions, the following may be used as the positive electrode active material 1321: a composite oxide obtained by substituting an alkali metal (e.g., sodium or potassium), an alkaline-earth metal (e.g., calcium, strontium, or barium), beryllium, or magnesium which is the same kind as a metal of the carrier ions for lithium in the lithium compound or the lithium-containing composite oxide.

As illustrated in FIG. 11B, the positive electrode active material layer 1309 includes positive electrode active materials 1321 which are particles capable of occluding and releasing carrier ions, and graphenes 1323 which cover a plurality of particles of the positive electrode active materials 1321 and at least partly surround the plurality of particles of the positive electrode active materials 1321. Further, in the positive electrode active material layer 1309 in the plan view, the different graphenes 1323 cover surfaces of the plurality of particles of the positive electrode active materials 1321. Note that the positive electrode active materials 1321 may be exposed in part of the positive electrode active material layer 1309.

The size of the particle of the positive electrode active material 1321 is preferably greater than or equal to 20 nm and less than or equal to 100 nm. Note that the size of the particle of the positive electrode active material 1321 is preferably smaller so that the surface area of the positive electrode active materials 1321 is increased and the distance of electrons (and carrier ions) transfer is shortened, because electrons (and carrier ions) transfer in the positive electrode active material layer 1309.

The characteristics of a power storage device can be obtained even when surfaces of the positive electrode active materials 1321 are not coated with carbon films; however, it is preferable to use graphene because current flows between the positive electrode active materials 1321 by hopping conduction.

Figure 11C:
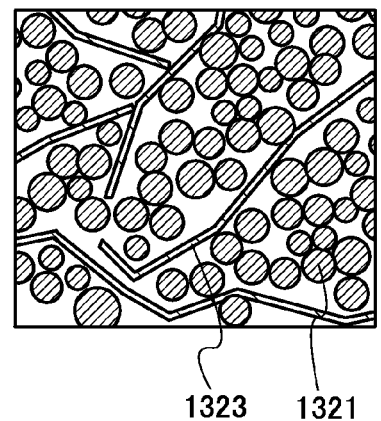

FIG. 11C is a cross-sectional view of part of the positive electrode active material layer 1309 in FIG. 11B. FIG. 11C illustrates the positive electrode active materials 1321 and the graphenes 1323 which cover the positive electrode active materials 1321 in the positive electrode active material layer 1309 in the plan view. The graphenes 1323 are observed to have linear shapes in cross section. One graphene or plural graphenes overlap with the plurality of particles of the positive electrode active materials 1321, or the plurality of particles of the positive electrode active materials 1321 are at least partly surrounded with one graphene or plural graphenes. Note that the graphene 1323 has a bag-like shape, and the plurality particles of the positive electrode active materials are at least partly surrounded with the bag-like portion in some cases. The graphene partly has openings where the positive electrode active materials 1321 are exposed in some cases.

The desired thickness of the positive electrode active material layer 1309 is determined in the range of 20 μm to 100 μm. It is preferable to adjust the thickness of the positive electrode active material layer 1309 as appropriate so that a crack and separation are not caused.

The positive electrode active material layer 1309 may contain a known conductive additive such as acetylene black particles having a volume 0.1 to 10 times as large as that of the graphene, or carbon particles having a one-dimensional expansion (e.g., carbon nanofibers), and/or a known binder such as polyvinylidene difluoride (PVDF).

As an example of the positive electrode active material, a material whose volume is expanded by occlusion of carrier ions is given. When such a material is used as the positive electrode active material, the positive electrode active material layer gets vulnerable and is partly collapsed by charge and discharge, resulting in lower reliability (e.g., inferior cycle characteristics) of a power storage device. However, the graphene 1323 covering the periphery of the positive electrode active materials 1321 in the positive electrode in the power storage device of this embodiment can prevent the positive electrode active materials 1321 from being pulverized and can prevent the positive electrode active material layer 1309 from being collapsed, even when the volume of the positive electrode active materials 1321 is increased/decreased due to charge/discharge. That is to say, the graphene 1323 included in the positive electrode in the power storage device of one embodiment of the present invention has a function of maintaining the bond between the positive electrode active materials 1321 even when the volume of the positive electrode active materials 1321 is increased/decreased due to charge/discharge. Thus, the use of the positive electrode 1311 allows an improvement in durability of the power storage device.

That is to say, a binder does not have to be used in forming the positive electrode active material layer 1309. Therefore, the proportion of the positive electrode active materials in the positive electrode active material layer with certain weight (volume) can be increased, leading to an increase in charge and discharge capacity per unit weight (volume) of the electrode.

The graphene 1323 has conductivity and is in contact with a plurality of particles of the positive electrode active materials 1321; thus, it also serves as a conductive additive. For this reason, a binder does not have to be used in forming the positive electrode active material layer 1309. Accordingly, the proportion of the positive electrode active materials in the positive electrode active material layer with certain weight (volume) can be increased, leading to an increase in charge and discharge capacity of a power storage device per unit weight (volume) of the electrode.

The graphene 1323 is obtained by electrochemical reduction with electric energy as described in Embodiment 2 and thus can have higher conductivity than graphene obtained by reduction through heat treatment. A sufficient conductive path (conductive path of carrier ions) is formed efficiently in the positive electrode active material layer 1309 containing the graphene formed by electrochemical reduction, so that the positive electrode active material layer 1309 and the positive electrode 1311 have high conductivity. Accordingly, the capacity of the positive electrode active material 1321 in the power storage device including the positive electrode 1311, which is almost equivalent to the theoretical capacity, can be utilized efficiently; thus, the discharge capacity can be sufficiently high.

Next, a formation method of the positive electrode 1311 will be described.

Slurry containing the particulate positive electrode active materials 1321 and graphene oxide is formed. Specifically, the particulate positive electrode active materials 1321 and a dispersion liquid containing graphene oxide are mixed to form the slurry. Note that the dispersion liquid containing graphene oxide can be formed by the method described in Embodiment 2.

After the positive electrode current collector 1307 is coated with the slurry, drying is performed for a certain period of time to remove a solvent from the slurry coating the positive electrode current collector 1307. For the details, refer to Embodiment 2 as appropriate. Note that in this case, molding may be performed by applying pressure as needed.

Then, the graphene oxide is electrochemically reduced with electric energy to the graphene 1323 as in the formation method of graphene in Embodiment 2. Through the above process, the positive electrode active material layer 1309 can be formed over the positive electrode current collector 1307, whereby the positive electrode 1311 can be formed.

When the positive electrode 1311 is formed, the graphene oxide is negatively charged in a polar solvent because the graphene oxide contains oxygen. As a result of being negatively charged, the graphene oxide is dispersed. Accordingly, the positive electrode active materials 1321 contained in the slurry are not easily aggregated, so that the size of the particle of the positive electrode active material 1321 can be prevented from increasing in the formation process of the positive electrode 1311. Thus, it is possible to prevent an increase in internal resistance and the transfer of electrons (and carrier ions) in the positive electrode active material 1321 is easy, leading to high conductivity of the positive electrode active material layer 1309 and the positive electrode 1311.

Next, a negative electrode and a formation method thereof will be described.

Figure 12A:
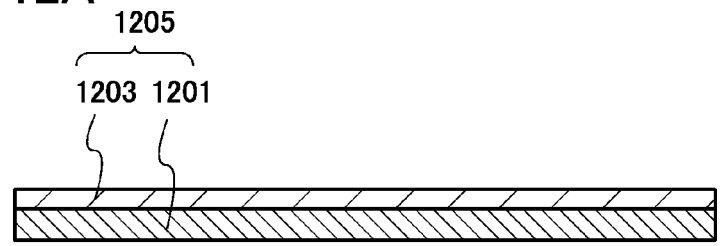
FIGS. 12A to 12D illustrate a negative electrode of a power storage device.
Figure 12B:
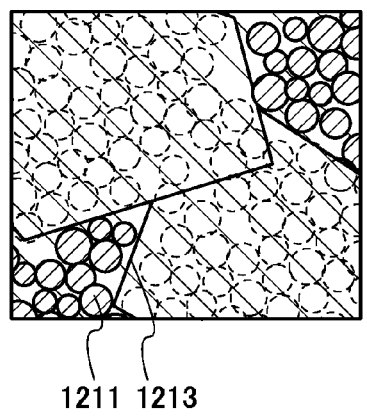

FIG. 12A is a cross-sectional view of a negative electrode 1205, and FIG. 12B is a plan view of part of a negative electrode active material layer 1203. In the negative electrode 1205, the negative electrode active material layer 1203 is formed over a negative electrode current collector 1201. The negative electrode active material layer 1203 includes at least a negative electrode active material 1211 and graphene 1213 and may further include a binder and/or a conductive additive.

As the negative electrode current collector 1201, a material having high conductivity such as copper, stainless steel, iron, or nickel can be used. The negative electrode current collector 1201 can have a foil shape, a plate shape, a mesh shape, or the like as appropriate.

The negative electrode active material layer 1203 is formed using the negative electrode active material 1211 capable of occluding and releasing carrier ions. As typical examples of the negative electrode active material 1211, lithium, aluminum, graphite, silicon, tin, and germanium are given. Further, a compound containing one or more of lithium, aluminum, graphite, silicon, tin, and germanium is given. Note that it is possible to omit the negative electrode current collector 1201 and use the negative electrode active material layer 1203 alone for the negative electrode. The theoretical capacity of germanium, silicon, lithium, and aluminum as the negative electrode active material 1211 is higher than that of graphite as the negative electrode active material 1211. When the theoretical capacity is high, the amount of negative electrode active material can be reduced, so that reductions in cost and size of a power storage device can be achieved.

The negative electrode active material layer 1203 includes negative electrode active materials 1211, which are particles, and the graphenes 1213 which cover a plurality of particles of the negative electrode active materials 1211 and at least partly surround the plurality of particles of the negative electrode active materials 1211. The different graphenes 1213 cover surfaces of the plurality of particles of the negative electrode active materials 1211 in the negative electrode active material layer 1203 in the plant view. The negative electrode active materials 1211 may partly be exposed.

Figure 12C:
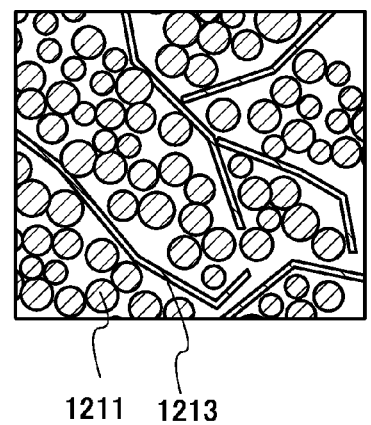

FIG. 12C is a cross-sectional view of part of the negative electrode active material layer 1203 in FIG. 12B. FIG. 12C illustrates the negative electrode active materials 1211 and the graphenes 1213. The graphenes 1213 cover a plurality of the negative electrode active materials 1211 in the negative electrode active material layer 1203 in the plan view. The graphenes 1213 are observed to have linear shapes in cross section. One graphene or plural graphenes overlap with the plurality of particles of the negative electrode active materials 1211, or the plurality of particles of the negative electrode active materials 1211 are at least partly surrounded with one graphene or plural graphenes. Note that the graphene 1213 has a bag-like shape, and the plurality particles of the negative electrode active materials are at least partly surrounded with the bag-like portion in some cases. The graphene 1213 partly has openings where the negative electrode active materials 1211 are exposed in some cases.

The desired thickness of the negative electrode active material layer 1203 is determined in the range of 20 μm to 100 μm.

The negative electrode active material layer 1203 may contain a known conductive additive such as acetylene black particles having a volume 0.1 to 10 times as large as that of the graphene, or carbon particles having a one-dimensional expansion (e.g., carbon nanofibers), and/or a known binder such as polyvinylidene difluoride.

The negative electrode active material layer 1203 may be predoped with lithium in such a manner that a lithium layer is formed on a surface of the negative electrode active material layer 1203 by a sputtering method. Alternatively, lithium foil is provided on the surface of the negative electrode active material layer 1203, whereby the negative electrode active material layer 1203 can be predoped with lithium.

As an example of the negative electrode active material 1211, a material whose volume is expanded by occlusion of carrier ions is given. When such a material is used, the negative electrode active material layer gets vulnerable and is partly collapsed by charge and discharge, resulting in lower reliability (e.g., inferior cycle characteristics) of a power storage device. However, the graphene 1213 covering the periphery of the negative electrode active materials 1211 in the negative electrode in the power storage device of this embodiment can prevent the negative electrode active materials 1211 from being pulverized and can prevent the negative electrode active material layer 1203 from being collapsed, even when the volume of the negative electrode active materials 1211 is increased/decreased due to charge/discharge. That is to say, the graphene 1213 included in the negative electrode in the power storage device of one embodiment of the present invention has a function of maintaining the bond between the negative electrode active materials 1211 even when the volume of the negative electrode active materials 1211 is increased/decreased due to charge/discharge. Thus, the use of the negative electrode 1205 allows an improvement in durability of the power storage device.

That is to say, a binder does not have to be used in forming the negative electrode active material layer 1203. Therefore, the proportion of the negative electrode active materials in the negative electrode active material layer with certain weight can be increased, leading to an increase in discharge capacity per unit weight of the electrode.

The graphene 1213 has conductivity and is in contact with a plurality of particles of the negative electrode active materials 1211; thus, it also serves as a conductive additive. Thus, a binder does not have to be used in forming the negative electrode active material layer 1203. Accordingly, the proportion of the negative electrode active materials in the negative electrode active material layer with certain weight (certain volume) can be increased, leading to an increase in charge and discharge capacity per unit weight (unit volume) of the electrode.

The graphene 1213 is obtained by electrochemical reduction with electric energy as described in Embodiment 2 and thus can have higher conductivity than graphene obtained by reduction through heat treatment. A sufficient conductive path (conductive path of carrier ions) is formed efficiently in the negative electrode active material layer 1203 containing the graphene formed by electrochemical reduction, so that the negative electrode active material layer 1203 and the negative electrode 1205 have high conductivity. Accordingly, the capacity of the negative electrode active material 1211 in a power storage device including the negative electrode 1205, which is almost equivalent to the theoretical capacity, can be utilized as efficiently; thus, the discharge capacity can be sufficiently high.

Note that the graphene 1213 also functions as a negative electrode active material capable of occluding and releasing carrier ions, leading to an increase in charge capacity of the negative electrode 1205.

Next, a formation method of the negative electrode active material layer 1203 in FIGS. 12B and 12C will be described.

Slurry containing the particulate negative electrode active materials 1211 and graphene oxide is formed. Specifically, the particulate negative electrode active materials 1211 and a dispersion liquid containing graphene oxide are mixed to form the slurry. The dispersion liquid containing graphene oxide can be formed by the method described in Embodiment 2.

After the negative electrode current collector 1201 is coated with the slurry, drying is performed for a certain period of time to remove a solvent from the slurry coating the negative electrode current collector 1201. Note that in this case, molding may be performed by applying pressure as needed.

Then, the graphene oxide is electrochemically reduced with electric energy to form the graphene 1213 as in the formation method of graphene in Embodiment 2. Through the above process, the negative electrode active material layer 1203 can be formed over the negative electrode current collector 1201, whereby the negative electrode 1205 can be formed.

When the negative electrode 1205 is formed, the graphene oxide is negatively charged in a polar solvent because it contains oxygen. As a result of being negatively charged, the graphene oxide is dispersed. Accordingly, the negative electrode active materials 1211 contained in the slurry are not easily aggregated, so that the size of the particle of the negative electrode active material 1211 can be prevented from increasing in the formation process of the negative electrode 1205. Thus, it is possible to prevent an increase in internal resistance and the transfer of electrons (and carrier ions) in the negative electrode active material 1211 is easy, leading to high conductivity of the negative electrode active material layer 1203 and the negative electrode 1205.

Next, the structure of a negative electrode in FIG. 12D will be described.

Figure 12D:
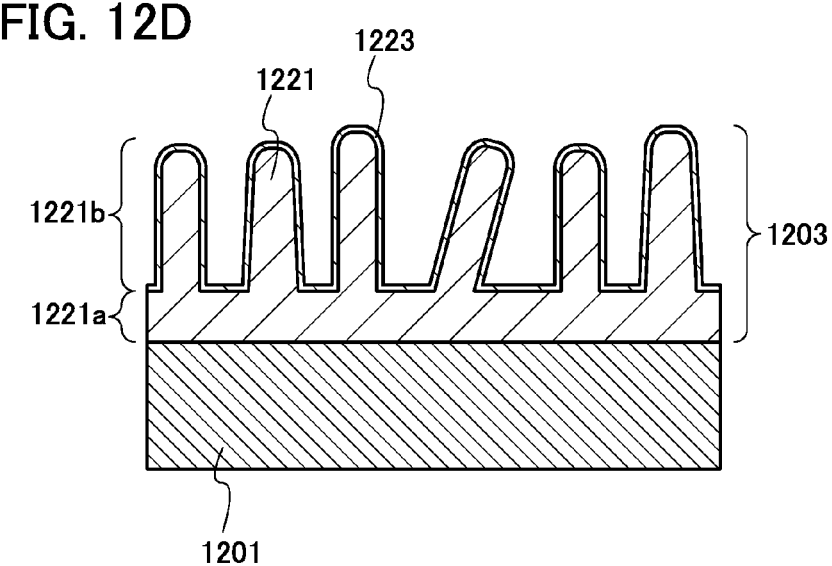

FIG. 12D is a cross-sectional view of the negative electrode where the negative electrode active material layer 1203 is formed over the negative electrode current collector 1201. The negative electrode active material layer 1203 includes a negative electrode active material 1221 having an uneven surface and graphene 1223 covering a surface of the negative electrode active material 1221.

The uneven negative electrode active material 1221 includes a common portion 1221*a* and a projected portion 1221*b* extending from the common portion 1221*a*. The projected portion 1221*b* can have a columnar shape such as a cylinder shape or a prism shape, or a needle shape such as a cone shape or a pyramid shape as appropriate. The top portion of the projected portion may be curved. The negative electrode active material 1221 is formed using a negative electrode active material capable of occluding and releasing carrier ions (typically, lithium ions) similarly to the negative electrode active material 1211. Note that the common portion 1221*a* and the projected portion 1221*b* may be formed using either the same material or different materials.

In the case of silicon which is an example of a negative electrode active material, the volume is approximately quadrupled due to occlusion of ions serving as carriers; therefore, the negative electrode active material gets vulnerable and is partly collapsed by charge and discharge, resulting in lower reliability (e.g., inferior cycle characteristics) of a power storage device. However, when silicon is used as the negative electrode active material 1221 in the negative electrode illustrated in FIG. 12D, the graphene 1223 covering the periphery of the negative electrode active material 1221 can prevent the negative electrode active material 1221 from being pulverized and can prevent the negative electrode active material layer 1203 from being collapsed, even when the volume of the negative electrode active material 1221 is increased/decreased due to charge/discharge.

When a surface of a negative electrode active material layer is in contact with an electrolyte contained in a power storage device, the electrolyte and the negative electrode active material react with each other, so that a film is formed on a surface of a negative electrode. The film is called a solid electrolyte interface (SEI) and considered necessary to relieve the reaction of the negative electrode and the electrolyte for stabilization. However, when the thickness of the film is increased, carrier ions are less likely to be occluded in the negative electrode, leading to problems such as a reduction in conductivity of carrier ions between the electrode and the electrolyte and a waste of the electrolyte.

The graphene 1213 coating the surface of the negative electrode active material layer 1203 can prevent an increase in thickness of the film, so that a decrease in charge and discharge capacity can be prevented.

Next, a formation method of the negative electrode active material layer 1203 in FIG. 12D will be described.

The uneven negative electrode active material 1221 is provided over the negative electrode current collector 1201 by a printing method, an ink-jet method, a CVD method, or the like. Alternatively, a negative electrode active material having a film shape is formed by a coating method, a sputtering method, an evaporation method, or the like, and then is selectively removed, so that the uneven negative electrode active material 1221 is provided over the negative electrode current collector 1201. Still alternatively, a surface of foil or a plate which is formed of lithium, aluminum, graphite, or silicon is partly removed to form the negative electrode current collector 1201 and the negative electrode active material 1221 that have an uneven shape. Further alternatively, a net formed of lithium, aluminum, graphite, or silicon may be used for the negative electrode active material and the negative electrode current collector.

Then, the uneven negative electrode active material 1221 is coated with a dispersion liquid containing graphene oxide. As a method for applying the dispersion liquid containing graphene oxide, the method described in Embodiment 2 may be employed as appropriate.

Subsequently, a solvent in the dispersion liquid containing graphene oxide is removed as described in Embodiment 2. After that, electric energy may be used to electrochemically reduce the graphene oxide to form the graphene 1213, as described in Embodiment 2.

When the graphene is thus formed with the use of the dispersion liquid containing graphene oxide, the surface of the uneven negative electrode active material 1221 can be coated with the graphene 1213 with an even thickness.

Note that the uneven negative electrode active material 1221 (hereinafter referred to as silicon whiskers) formed of silicon can be provided over the negative electrode current collector 1201 by an LPCVD method using silane, silane chloride, silane fluoride, or the like as a source gas.

The silicon whiskers may be amorphous. When amorphous silicon whiskers are used for the negative electrode active material layer 1203, the volume is less likely to be changed due to occlusion and release of carrier ions (e.g., stress caused by expansion in volume is relieved). For this reason, the silicon whiskers and the negative electrode active material layer 1203 can be prevented from being pulverized and collapsed, respectively, due to repeated cycles of charge and discharge; accordingly, a power storage device can have further improved cycle characteristics.

Alternatively, the silicon whisker may be crystalline. In this case, the crystalline structure having excellent conductivity and carrier ion mobility is in contact with the current collector in a wide range of area. Therefore, it is possible to further improve the conductivity of the entire negative electrode, which enables charge and discharge to be performed at much higher speed; accordingly, a power storage device whose charge and discharge capacity is improved can be fabricated.

Still alternatively, the silicon whisker may include a core, which is a crystalline region, and an outer shell covering the core, which is an amorphous region.

The amorphous outer shell has a characteristic that the volume is less likely to be changed due to occlusion and release of carrier ions (e.g., stress caused by expansion in volume is relieved). In addition, the crystalline core, which has excellent conductivity and ion mobility, has a characteristic that the rate of occluding ions and the rate of releasing ions are high per unit mass. Thus, when the silicon whisker having the core and the outer shell is used for the negative electrode active material layer, charging and discharging can be performed at high speed; accordingly, a power storage device whose charge and discharge capacity and cycle characteristics are improved can be fabricated.

Figure 13:
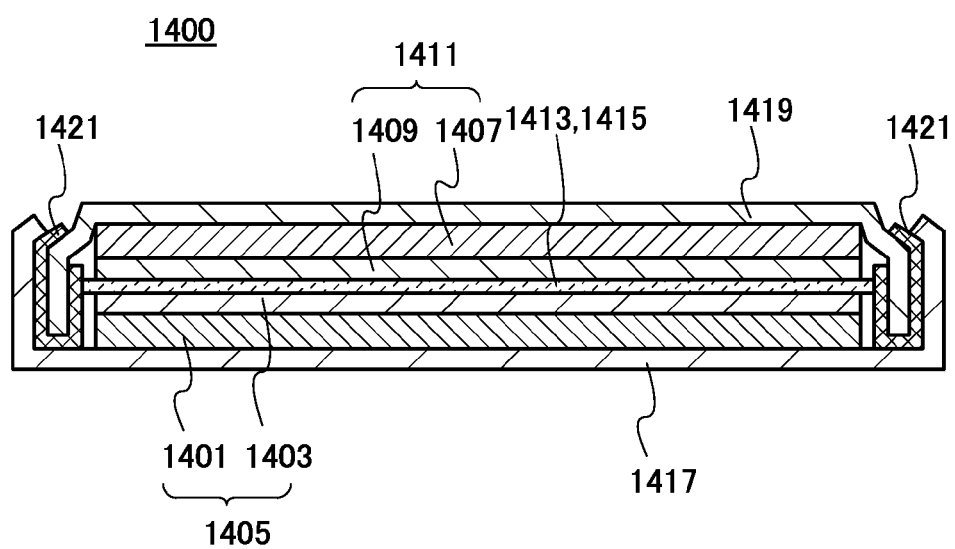
FIG. 13 illustrates a power storage device.

Next, how to fabricate a power storage device including the positive electrode and the negative electrode of this embodiment will be described. FIG. 13 is a cross-sectional view of a lithium secondary battery, and the cross-sectional structure thereof will be described below.

A lithium secondary battery 1400 includes a negative electrode 1405 including a negative electrode current collector 1401 and a negative electrode active material layer 1403, a positive electrode 1411 including a positive electrode current collector 1407 and a positive electrode active material layer 1409, and a separator 1413 provided between the negative electrode 1405 and the positive electrode 1411. Note that the separator 1413 is impregnated with an electrolyte 1415. The negative electrode current collector 1401 is connected to an external terminal 1417 and the positive electrode current collector 1407 is connected to an external terminal 1419. An end portion of the external terminal 1419 is embedded in a gasket 1421. That is to say, the external terminals 1417 and 1419 are insulated from each other by the gasket 1421.

As the negative electrode current collector 1401 and the negative electrode active material layer 1403, the negative electrode current collector 1201 and the negative electrode active material layer 1203, which are described above, can be used as appropriate.

As the positive electrode current collector 1407 and the positive electrode active material layer 1409, the positive electrode current collector 1307 and the positive electrode active material layer 1309, which are described above, can be used as appropriate.

As the separator 1413, an insulating porous material is used. Typical examples of the separator 1413 include paper; nonwoven fabric; a glass fiber; ceramics; and synthetic fiber containing nylon (polyamide), vinylon (polyvinyl alcohol based fiber), polyester, acrylic, polyolefin, or polyurethane.

When a positive electrode provided with a spacer over the positive electrode active material layer is used as the positive electrode 1411, the separator 1413 does not necessarily have to be provided.

As a solute of the electrolyte 1415, a material which contains carrier ions is used. Typical examples of the solute of the electrolyte include lithium salts such as $LiClO_4$, $LiAsF_6$, $LiBF_4$, $LiPF_6$, and $Li(C_2F_5SO_2)_2N$.

Note that when carrier ions are alkali metal ions other than lithium ions, alkaline-earth metal ions, beryllium ions, or magnesium ions, instead of lithium in the above lithium salts, an alkali metal (e.g., sodium or potassium), an alkaline-earth metal (e.g., calcium, strontium, or barium), beryllium, or magnesium may be used for a solute of the electrolyte 1415.

As a solvent of the electrolyte 1415, a material in which lithium ions can transfer is used. As the solvent of the electrolyte 1415, an aprotic organic solvent is preferably used. Typical examples of aprotic organic solvents include ethylene carbonate, propylene carbonate, dimethyl carbonate, diethyl carbonate, y-butyrolactone, acetonitrile, dimethoxyethane, tetrahydrofuran, and the like, and one or more of these materials can be used. When a gelled high-molecular material is used as the solvent of the electrolyte 1415, safety against liquid leakage and the like is improved. Further, the lithium secondary battery 1400 can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which are less likely to burn and volatilize as a solvent of the electrolyte 1415 can prevent a power storage device from exploding or catching fire even when the power storage device internally shorts out or the internal temperature increases due to overcharging or the like.

As the electrolyte 1415, a solid electrolyte such as $Li_3PO_4$ can be used. Other examples of the solid electrolyte include $Li_xPO_yN_z$ (x, y, and z are positive real numbers) which is formed by mixing $Li_3PO_4$ with nitrogen; $Li_2S$—$SiS_2$; $Li_2S$—$P_2S_5$; and $Li_2S$—$B_2S_3$. Any of the above solid electrolytes which is doped with LiI or the like may be used.

For the external terminals 1417 and 1419, a metal material such as a stainless steel plate or an aluminum plate can be used as appropriate.

Note that in this embodiment, a coin-type lithium secondary battery is given as the lithium secondary battery 1400; however, any of lithium secondary batteries with various shapes, such as a sealing-type lithium secondary battery, a cylindrical lithium secondary battery, and a square-type lithium secondary battery, can be used. Further, a structure in which a plurality of positive electrodes, a plurality of negative electrodes, and a plurality of separators are stacked or rolled may be employed.

A lithium secondary battery has a small memory effect, a high energy density, a large capacity, and a high operation voltage, which enables reduction in size and weight. Further, the lithium secondary battery does not easily deteriorate due to repeated charge and discharge and can be used for a long time, so that cost can be reduced.

The formation methods of a positive electrode and a negative electrode, which are described in Embodiment 2 and this embodiment, are employed as appropriate to form the negative electrode 1405 and the positive electrode 1411.

Next, the negative electrode 1405, the separator 1413, and the positive electrode 1411 are soaked in the electrolyte 1415. Then, the negative electrode 1405, the separator 1413, the gasket 1421, the positive electrode 1411, and the external terminal 1419 are stacked in this order over the external terminal 1417, and the external terminal 1417 and the external terminal 1419 are crimped to each other with a "coin cell crimper". Thus, the coin-type lithium secondary battery can be fabricated.

Note that a spacer and a washer may be provided between the external terminal 1417 and the negative electrode 1405 or between the external terminal 1419 and the positive electrode 1411 so that the connection between the external terminal 1417 and the negative electrode 1405 or between the external terminal 1419 and the positive electrode 1411 is enhanced.

The methods for forming a positive electrode and a negative electrode which are described in this embodiment can be applied to the structure of the flexible substrate processing apparatus of one embodiment of the present invention, which is described in Embodiment 1, conditions for operating the apparatus, and the like. The flexible substrate processing apparatus of one embodiment of the present invention can efficiently produce the positive electrode and the negative electrode of a power storage device which are described in this embodiment. Further, the flexible substrate processing apparatus of another embodiment of the present invention can efficiently produce a stack of a positive electrode, a separator, and a negative electrode.

This embodiment can be implemented in appropriate combination with any of the other embodiments.

This application is based on Japanese Patent Application serial no. 2011-257745 filed with the Japan Patent Office on Nov. 25, 2011, the entire contents of which are hereby incorporated by reference.

What is claimed is:

1. A method for reducing graphene oxide to form graphene with the use of a flexible substrate processing apparatus, the flexible substrate processing apparatus comprising:

a substrate carrying-out portion comprising an unwinder provided with a first bobbin configured so that a flexible substrate is wound around the first bobbin;

a reduction treatment portion comprising a first bath configured to be provided with an electrolyte, a first electrode configured so that the flexible substrate is located in parallel with the first electrode in the first bath, and first rollers configured so that the flexible substrate is soaked in the electrolyte, wherein the electrolyte includes an aprotic solvent;

a washing portion comprising a second bath configured to be provided with a washing solution and second rollers configured to support the flexible substrate so that the flexible substrate is soaked in the washing solution;

a drying portion comprising a drying means; and a substrate carrying-in portion comprising a winder provided with a second bobbin configured to take up the flexible substrate, wherein one or more of the first bobbin, the second bobbin, the first rollers, and the second rollers serve as a second electrode, the method comprising the steps of:

making the flexible substrate be contact with the first bobbin and taking the flexible substrate up in the substrate carrying-out portion;

making the flexible substrate and the first electrode be soaked in the electrolyte in the first bath;

reducing graphene oxide contained in a film-like structure body formed on the flexible substrate to form graphene by supplying a certain potential to the second electrode so that the flexible substrate is at the same potential as the second electrode, wherein the film-like structure body further comprises an electrode active material;

washing the film-like structure body and the flexible substrate in the second bath;

drying the film-like structure body and the flexible substrate with the use of the drying means in the drying portion; and taking the flexible substrate up by the second bobbin wherein a reduction potential for the reducing step to be supplied is a reduction potential determined relative to a redox potential of lithium metal, and wherein the reduction potential for the reducing step to be supplied is 2.0 V.

2. The method according to claim 1, further comprising the steps of:

forming the film-like structure body over a surface of the flexible substrate; and drying the film-like structure body formed on the flexible substrate.

3. The method according to claim 1, further comprising the step of:

forming a stack of the flexible substrate and plural flexible substrates other than the flexible substrate before taking the flexible substrate up by the second bobbin.

4. The method according to claim 1, wherein a proportion of carbon atoms in the graphene measured by X-ray photoelectron spectroscopy greater than or equal to 80% and less than or equal to 90%, wherein a proportion of oxygen atoms in the graphene measured by X-ray photoelectron spectroscopy is greater than or equal to 10% and less than or equal to 20%, and wherein a proportion of sp2-bonded carbon atoms of carbon atoms in the graphene is greater than or equal to 50% and less than or equal to 70%.

5. The method according to claim 1,
wherein a proportion of part of oxygen remaining in the graphene is higher than or equal to 2% and lower than or equal to 20%.

6. The method according to claim 1,
wherein a material used for the film-like structure body is a mixture in which an oxide and an organic compound are mixed.

7. The method according to claim 4,
wherein the graphene comprises a sulfate ion.

8. The method according to claim 4,
wherein the electrode active material is a positive electrode active material.

* * * * *